US012801474B2

(12) United States Patent
Amarnath et al.

(10) Patent No.: US 12,801,474 B2
(45) Date of Patent: Nov. 17, 2026

(54) SYSTEMS AND METHODS FOR UNIFIED PROBLEM OBSERVABILITY OF WORKLOADS

(71) Applicant: Walmart Apollo, LLC, Bentonville, AR (US)

(72) Inventors: Amithkumar Amarnath, Dublin, CA (US); Jayaraj Jayaraman, Bengaluru (IN); Manoj Radhakrishnan, Wylie, TX (US); Reddy Prasanth Adalam, Bengaluru (IN); Reyner Pablo Bacallao, Bentonville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 1 day.

(21) Appl. No.: 18/737,204

(22) Filed: Jun. 7, 2024

(65) Prior Publication Data

US 2025/0377965 A1 Dec. 11, 2025

(51) Int. Cl.
*G06F 11/07* (2006.01)
*G06F 18/232* (2023.01)

(52) U.S. Cl.
CPC ...... *G06F 11/0787* (2013.01); *G06F 11/0721* (2013.01); *G06F 18/232* (2023.01)

(58) Field of Classification Search
CPC . G06F 11/0787; G06F 18/232; G06F 11/0721
See application file for complete search history.

(56) References Cited

U.S. PATENT DOCUMENTS 7,774,485 B2 8/2010 Patrick et al.
11,792,086 B1 10/2023 Singwi et al.
2015/0286684 A1 10/2015 Heinz et al.
2016/0350173 A1 12/2016 Ahad
2019/0102266 A1* 4/2019 Park .................... G06F 11/1658
2020/0250548 A1 8/2020 Shwartz et al.
2023/0273610 A1 8/2023 Anand et al.
(Continued)

FOREIGN PATENT DOCUMENTS

CN 111752759 A 10/2020
CN 117056171 A 11/2023

OTHER PUBLICATIONS

R. Slag, "Kafkalytics: Anti-pattern detection in Kafka message bus," Master of Science Degree Thesis Paper, Delft University of Technology, (Year: 2016), 86 pages.
(Continued)

*Primary Examiner* — Marc Duncan
*Assistant Examiner* — Audrey Emma Whitesell
(74) *Attorney, Agent, or Firm* — Morgan, Lewis & Bockius LLP; Manita Rawat

(57) ABSTRACT

Systems and methods for automatically identifying and resolving problem instances in data service workloads are disclosed. In some embodiments, a disclosed method includes: monitoring a workload of at least one data service platform; determining, based on a catalog of problem patterns and metadata of the workload, whether a problem pattern exists in the workload using at least one machine learning model; identifying a problem instance for the workload in accordance with a determination that a problem pattern exists in the workload; creating a problem record for the problem instance; and storing the problem record in a database.

18 Claims, 11 Drawing Sheets

(56) References Cited

U.S. PATENT DOCUMENTS

| | | | |
|---|---|---|---|
| 2024/0242155 | A1 | 7/2024 | Stern et al. |
| 2024/0291718 | A1* | 8/2024 | Vuda ........................ H04L 41/12 |
| 2024/0303359 | A1* | 9/2024 | Chopra ............... G06F 21/6218 |
| 2024/0394149 | A1* | 11/2024 | Ambaljeri ........... G06F 16/2358 |
| 2025/0147882 | A1 | 5/2025 | Creed |

OTHER PUBLICATIONS

P. Brebner, "Apache Kafka® Anti-Patterns and How to Avoid Them," Instaclustr by NetApp, Nov. 8, 2023, 15 pages.
A. Gupta, "Apache Kafka Patterns and Anti-Patterns," DZone, Downloaded Mar. 14, 2024, 4 pages.

* cited by examiner

800

900

1000

SYSTEMS AND METHODS FOR UNIFIED PROBLEM OBSERVABILITY OF WORKLOADS

TECHNICAL FIELD

This application relates generally to data service reliability optimization and, more particularly, to systems and methods for automatically identifying and resolving problem instances in data service workloads, to prevent incidents or monitor live facts and events leading into incidents.

BACKGROUND

A large-scale distributed system is composed of a large number of microservices and client applications integrated using a data service platform, e.g. Kafka®. Such distributed system can encounter production incidents due to the way the client applications are designed, developed, configured, deployed, and maintained.

There has been a deficiency in both the ability to effectively identify issues that could cause or have already caused production incidents in large-scale distributed systems, and the availability of efficient methods for promptly resolving such issues. Production-disrupting issues could be introduced into the systems at various stages. In the absence of effective mechanisms, app developers are responsible for adhering to the best practices and guidelines provided by platform service providers when designing, developing, deploying, and maintaining applications in production. However, there is no reliable method to analyze and detect instances where these best practices are not followed in the workloads deployed in production.

Given the intricate design, development, and deployment of client applications using various platform technologies, identifying and resolving issues promptly becomes exceedingly difficult when problems arise from different sources such as different brokers, different application platforms, network infrastructure, or the client applications themselves. The incidents in an existing large-scale distributed system need the presence of all specialists from the platform services teams and the app teams in the incident calls. Clearly, in the absence of a cohesive monitoring of all the interconnected systems, it requires a significant amount of time and effort to identify and resolve the problems. In addition, addressing the identified issue usually entails a sequence of actions that must be carried out in various components of the overall system, which needs synchronization of all relevant components and teams. As such, existing resolution methods involve coordination of human engineers and primarily manual processes, which is both time-consuming and prone to errors.

SUMMARY

The embodiments described herein are directed to systems and methods for automatically identifying and resolving problem instances in data service workloads, to prevent incidents or monitor live facts and events leading into incidents.

In various embodiments, a system including a non-transitory memory configured to store instructions thereon and at least one processor is disclosed. The at least one processor is operatively coupled to the non-transitory memory and configured to read the instructions to: monitor a workload of at least one data service platform; determine, based on a catalog of problem patterns and metadata of the workload, whether a problem pattern exists in the workload using at least one machine learning model; identify a problem instance for the workload in accordance with a determination that a problem pattern exists in the workload; create a problem record for the problem instance; and store the problem record in a database.

In various embodiments, a computer-implemented method is disclosed. The computer-implemented method includes: monitoring a workload of at least one data service platform; determining, based on a catalog of problem patterns and metadata of the workload, whether a problem pattern exists in the workload using at least one machine learning model; identifying a problem instance for the workload in accordance with a determination that a problem pattern exists in the workload; creating a problem record for the problem instance; and storing the problem record in a database.

In various embodiments, a non-transitory computer readable medium having instructions stored thereon is disclosed. The instructions, when executed by at least one processor, cause at least one device to perform operations including: monitoring a workload of at least one data service platform; determining, based on a catalog of problem patterns and metadata of the workload, whether a problem pattern exists in the workload using at least one machine learning model; identifying a problem instance for the workload in accordance with a determination that a problem pattern exists in the workload; creating a problem record for the problem instance; and storing the problem record in a database.

BRIEF DESCRIPTION OF THE DRAWINGS

The features and advantages of the present invention will be more fully disclosed in, or rendered obvious by the following detailed description of the preferred embodiments, which are to be considered together with the accompanying drawings wherein like numbers refer to like parts and further wherein.

DETAILED DESCRIPTION

Figure 1:
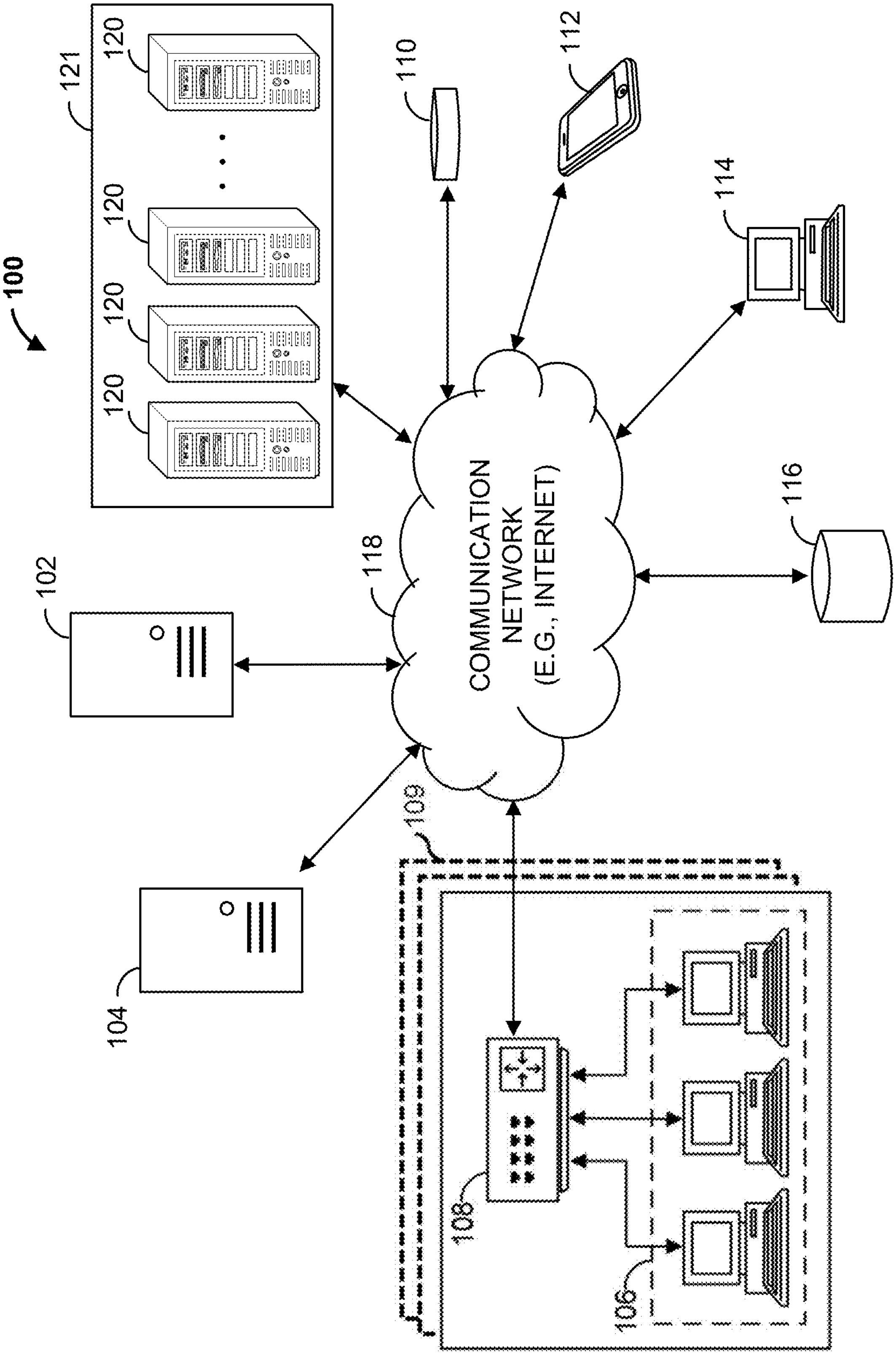
FIG. 1 is a network environment configured for identifying and resolving problem instances in data service workloads, in accordance with some embodiments of the present teaching.

This description of the exemplary embodiments is intended to be read in connection with the accompanying drawings, which are to be considered part of the entire written description. Terms concerning data connections, coupling and the like, such as "connected" and "interconnected," and/or "in signal communication with" refer to a relationship wherein systems or elements are electrically and/or wirelessly connected to one another either directly or indirectly through intervening systems, as well as both moveable or rigid attachments or relationships, unless expressly described otherwise. The term "operatively coupled" is such a coupling or connection that allows the pertinent structures to operate as intended by virtue of that relationship.

In the following, various embodiments are described with respect to the claimed systems as well as with respect to the claimed methods. Features, advantages or alternative embodiments herein can be assigned to the other claimed objects and vice versa. In other words, claims for the systems can be improved with features described or claimed in the context of the methods. In this case, the functional features of the method are embodied by objective units of the systems.

In a large-scale distributed system of a big corporation, where tens of thousands of applications are integrated using thousands of clusters and topics via a data service platform, it is difficult to develop systems and methods for recognizing all problem patterns that have creeped into the applications during their life cycles and enabling the application owners and support teams to prevent as well as resolve the production incidents caused by the problem patterns.

One objective of various embodiments in the present teaching is to provide a solution for recognition of problem patterns in workloads of large-scale distributed systems and recognizing and enabling to resolve centrally, quickly, and efficiently the problem instances caused by those problem patterns. In some embodiments, a disclosed solution includes a comprehensive catalog of problem patterns, against which the workloads are analyzed and any instances of these problem patterns can be found. In some embodiments, the disclosed solution offers essential resources to promptly address the identified issues with automated standard operating procedures (SOPs), with little or no reliance on expertise from different application and platform teams.

In some embodiments, a disclosed system provides a one-stop solution that brings observability, operability and recoverability of workloads distributed on many data service platforms, such as Kafka®, Walmart Cloud Native Platform (WCNP), OneOps®, and other managed platform services, centrally into a single platform. The disclosed system can pro-actively identify various problem patterns which client applications may have acquired throughout their development and production lifecycles. These problem patterns have the potential to cause production incidents. In some embodiments, the disclosed system can proactively fix the potential issues, thereby preventing the workloads from encountering such incidents in the first place. By leveraging the observability and recoverability features offered by the disclosed system, engineers and associates can promptly and effortlessly restore workloads to their normal states in the event of production incidents.

In some embodiments, failure to adhere to established and future best practices and guidelines can be represented as detectable problem patterns. The detection of workloads suffering from these problem patterns can be automated by a disclosed system for proactive identification and prevention of incidents due to these problem patterns. The disclosed system can also provide a unified observability into live facts, events and potential problems that can lead to or have already led to production incidents. The unified observability combines the observability data from the individual platform systems, resulting in novel insights and valuable observations that were previously only accessed and comprehended by proficient individuals who possess knowledge and proficiency in utilizing the monitoring systems and tools of all relevant platform services. In addition, the disclosed system provides fully automated recoverability mechanisms for swiftly recovering from the incidents. These recoverability SOPs may utilize and coordinate the administrative and operations application programming interfaces (APIs) of the underlying platform services concerned. As such, users are not required to have knowledge of or switch between several tools in order to tackle the issue.

In some embodiments, a disclosed system can populate a catalog of problem patterns, and evolve the problem pattern catalog as and when new problem patterns and best practices are discovered. In some embodiments, the system utilizes a method for detecting the instances where problem patterns exist in the workloads, e.g. by periodically scanning and monitoring the workloads.

In some embodiments, a disclosed system builds a catalog of fully automated recoverability workflow SOPs that orchestrate multiple resolution steps across multiple platform technologies without requiring the presence of experts or in-depth knowledge of how to use the platform tools. The system can evolve the catalog of SOPs as new problem patterns are discovered or when a better solution is found for a given problem pattern. The system can provide the user with the fully automated SOPs for recovering from the incidents quickly and efficiently; allow the user to resolve the incidents discovered by executing suitable SOPs provided; and allow the user to gain deep insights as to what live facts and events could have led to incidents being handled.

In some embodiments, the system can provide a simple and centralized user interface for users to browse the problem instances and resolve the issues with the suitable SOPs provided. As such, the system provides a unified solution to proactively scan, identify and fix potential problems beforehand or during the incidents with critical observability into live facts and events leading to incidents and great insights, which can be implemented with only a few clicks of buttons without requiring platform experts.

Furthermore, in the following, various embodiments are described with respect to systems and methods for automatically identifying and resolving problem instances in data service workloads are disclosed. In some embodiments, a disclosed method includes: monitoring a workload of at least one data service platform; determining, based on a catalog of problem patterns and metadata of the workload, whether a problem pattern exists in the workload using at least one machine learning model; identifying a problem instance for the workload in accordance with a determination that a problem pattern exists in the workload; creating a problem record for the problem instance; and storing the problem record in a database. In some embodiments, a disclosed method includes: identifying a problem instance for a workload associated with a plurality of data service platforms; determining, using at least one machine learning model, a problem solution based on the problem instance and a catalog of problem solutions; executing the problem solution including operations across the plurality of data service platforms; and recovering the workload in accordance with a determination that the problem instance is resolved by the problem solution.

Turning to the drawings, FIG. 1 is a network environment 100 configured for automatically identifying and resolving problem instances in data service workloads, in accordance with some embodiments of the present teaching. The network environment 100 includes a plurality of devices or systems configured to communicate over one or more network channels, illustrated as a network cloud 118. For example, in various embodiments, the network environment 100 can include, but not limited to, a data reliability computing device 102, a server 104 (e.g., a web server or an application server), a cloud-based engine 121 including one or more processing devices 120, workstation(s) 106, a database 116, and one or more user computing devices 110, 112, 114 operatively coupled over the network 118. The data reliability computing device 102, the server 104, the workstation(s) 106, the processing device(s) 120, and the multiple user computing devices 110, 112, 114 can each be any suitable computing device that includes any hardware or hardware and software combination for processing and handling information. For example, each can include one or more processors, one or more field-programmable gate arrays (FPGAs), one or more application-specific integrated circuits (ASICs), one or more state machines, digital circuitry, or any other suitable circuitry. In addition, each can transmit and receive data over the communication network 118.

In some examples, each of the data reliability computing device 102 and the processing device(s) 120 can be a computer, a workstation, a laptop, a server such as a cloud-based server, or any other suitable device. In some examples, each of the processing devices 120 is a server that includes one or more processing units, such as one or more graphical processing units (GPUs), one or more central processing units (CPUs), and/or one or more processing cores. Each processing device 120 may, in some examples, execute one or more virtual machines. In some examples, processing resources (e.g., capabilities) of the one or more processing devices 120 are offered as a cloud-based service (e.g., cloud computing). For example, the cloud-based engine 121 may offer computing and storage resources of the one or more processing devices 120 to the data reliability computing device 102.

In some examples, each of the multiple user computing devices 110, 112, 114 can be a cellular phone, a smart phone, a tablet, a personal assistant device, a voice assistant device, a digital assistant, a laptop, a computer, a laser-based code scanner, or any other suitable device. In some examples, the server 104 hosts one or more websites or apps providing one or more products or services. In some examples, the data reliability computing device 102, the processing devices 120, and/or the server 104 are operated by a corporation, e.g. a big retailer, and the multiple user computing devices 110, 112, 114 are operated by customers, advertisers, associates or managers of the corporation. In some examples, the processing devices 120 are operated by a third party (e.g., a cloud-computing provider).

The workstation(s) 106 are operably coupled to the communication network 118 via a router (or switch) 108. The workstation(s) 106 and/or the router 108 may be located at one or more departments 109 of a corporation. In some examples, the departments 109 correspond to different services, product categories, corporate functions, retail departments, stores, channels and/or platforms of a retailer. In some examples, different departments 109 may execute different client applications that are integrated using clusters and topics via a data service platform.

The workstation(s) 106 can communicate with the data reliability computing device 102 over the communication network 118. The workstation(s) 106 may send data to, and receive data from, the data reliability computing device 102. For example, the workstation(s) 106 may transmit data identifying transactions, inventory or supply chain data at the one or more departments 109 to the data reliability computing device 102. The workstation(s) 106 may also transmit other data related to the one or more departments 109 to the data reliability computing device 102.

Although FIG. 1 illustrates three user computing devices 110, 112, 114, the network environment 100 can include any number of user computing devices 110, 112, 114. Similarly, the network environment 100 can include any number of the data reliability computing devices 102, the processing devices 120, the workstations 106, the departments 109, the servers 104, and the databases 116.

The communication network 118 can be a WiFi® network, a cellular network such as a 3GPP® network, a Bluetooth® network, a satellite network, a wireless local area network (LAN), a network utilizing radio-frequency (RF) communication protocols, a Near Field Communication (NFC) network, a wireless Metropolitan Area Network (MAN) connecting multiple wireless LANs, a wide area network (WAN), or any other suitable network. The communication network 118 can provide access to, for example, the Internet.

In some embodiments, each of the first user computing device 110, the second user computing device 112, and the Nth user computing device 114 may communicate with the departments 109 over the communication network 118. For example, one of the multiple user computing devices 110, 112, 114 may be operable to view, access, and interact with a website, such as a retailer's website, hosted by a server in an e-commerce department 109. The server may transmit user session data related to a customer's activity (e.g., interactions) on the website. For example, a customer may operate one of the user computing devices 110, 112, 114 to initiate a web browser that is directed to the website. The customer may, via the web browser, search for items, view item advertisements for items displayed on the website, and click on item advertisements and/or items in the search result, for example. The website may capture these activities as user session data, and transmit the user session data to the data reliability computing device 102 over the communication network 118. The website may also allow the operator to add one or more of the items to an online shopping cart, and allow the customer to perform a "checkout" of the shopping cart to purchase the items. In some examples, the data reliability computing device 102 obtains metadata regarding purchase data and user interaction data exchanged between the departments 109.

In some embodiments, an engineer (or a manager or an associate) of a corporation (e.g. a retailer) may operate one of the user computing devices 110, 112, 114 to access an application programming interface (API) hosted by the server 104. The engineer may, via the API, perform actions on workloads suffering from problem patterns along with supporting data from multiple platform services' observability data sources, to have observability of live facts and events that are possibly causing incidents in the workloads. The engineer may also view and select recoverability methods to recover from incidents quickly and efficiently. The engineer may perform these actions during a development stage or a production stage of the data service platform. The API may capture these activities as user session data, and transmit the user session data to the data reliability computing device 102 over the communication network 118.

In some examples, the server 104 transmits to the data reliability computing device 102 an observability request seeking observability data of (1) problems that can lead to incidents and/or (2) live events and facts around the incidents being handled. In some examples, the data reliability computing device 102 may execute one or more models (e.g., programs or algorithms), such as a machine learning model, deep learning model, statistical model, etc., to generate the observability data. The observability data may be generated based on the observability request, a periodic configuration, and/or a consumer alert. The data reliability computing device 102 may monitor workloads of a data service platform; and determine, based on a catalog of problem patterns and metadata of the workloads, whether a problem pattern exists in any workload. The data reliability computing device 102 may identify a problem instance in accordance with a determination that a problem pattern exists in the workloads, and create a problem record for the problem instance. The data reliability computing device 102 may then store the problem record in a database, and/or transmit the problem record as observability data to the server 104.

In some examples, the server 104 transmits to the data reliability computing device 102 a recover request seeking a recovery of a problematic workload, e.g. a workload having a problem pattern identified in the observability data. In some examples, the data reliability computing device 102 may execute one or more models (e.g., programs or algorithms), such as a machine learning model, deep learning model, statistical model, etc., to recover the problematic workload and generate a recover confirmation. The workload recovery may be performed based on the recover request, and/or an automatic configuration upon a detection of the problem instance in the workload. The data reliability computing device 102 may identify a problem instance for the workload associated with one or more data service platforms; and determine a problem solution based on the problem instance and a catalog of problem solutions. The data reliability computing device 102 may execute the problem solution including operations across the one or more data service platforms; and recover the workload in accordance with a determination that the problem instance is resolved by the problem solution. The data reliability computing device 102 may then generate and transmit the recover confirmation to the server 104.

In some embodiments, the data reliability computing device 102 is further operable to communicate with the database 116 over the communication network 118. For example, the data reliability computing device 102 can store data to, and read data from, the database 116. The database 116 can be a remote storage device, such as a cloud-based server, a disk (e.g., a hard disk), a memory device on another application server, a networked computer, or any other suitable remote storage. Although shown remote to the data reliability computing device 102, in some examples, the database 116 can be a local storage device, such as a hard drive, a non-volatile memory, or a USB stick. For example, the data reliability computing device 102 may store user request and instruction data received from the server 104 in the database 116. The data reliability computing device 102 may receive department related data from the one or more departments 109 and store them in the database 116. The data reliability computing device 102 may also receive from an e-commerce department 109 user session data identifying events associated with browsing sessions, and may store the user session data in the database 116.

In some examples, the data reliability computing device 102 generates and/or updates different models (e.g., machine learning models, deep learning models, statistical models, algorithms, etc.) for automatically identifying and resolving problem instances in data service workloads. The data reliability computing device 102 may generate training data for the models based on data including but not limited to: historical problem data, historical detected problem instances, historical solution data, historical or labelled problem data and solution data, and metadata related to client applications, clusters, topics of the data service platform. The data reliability computing device 102 trains the models based on their corresponding training data, and stores the models in a database, such as in the database 116 (e.g., a cloud storage). The models, when executed by the data reliability computing device 102, allow the data reliability computing device 102 to generate observability data and corresponding problem solution data.

In some examples, the data reliability computing device 102 assigns the models (or parts thereof) for execution to one or more processing devices 120. For example, each model may be assigned to a virtual machine hosted by a processing device 120. The virtual machine may cause the models or parts thereof to execute on one or more processing units such as GPUs. In some examples, the virtual machines assign each model (or part thereof) among a plurality of processing units. Based on the output of the models, the data reliability computing device 102 may generate observability data and corresponding problem solutions.

Figure 2:
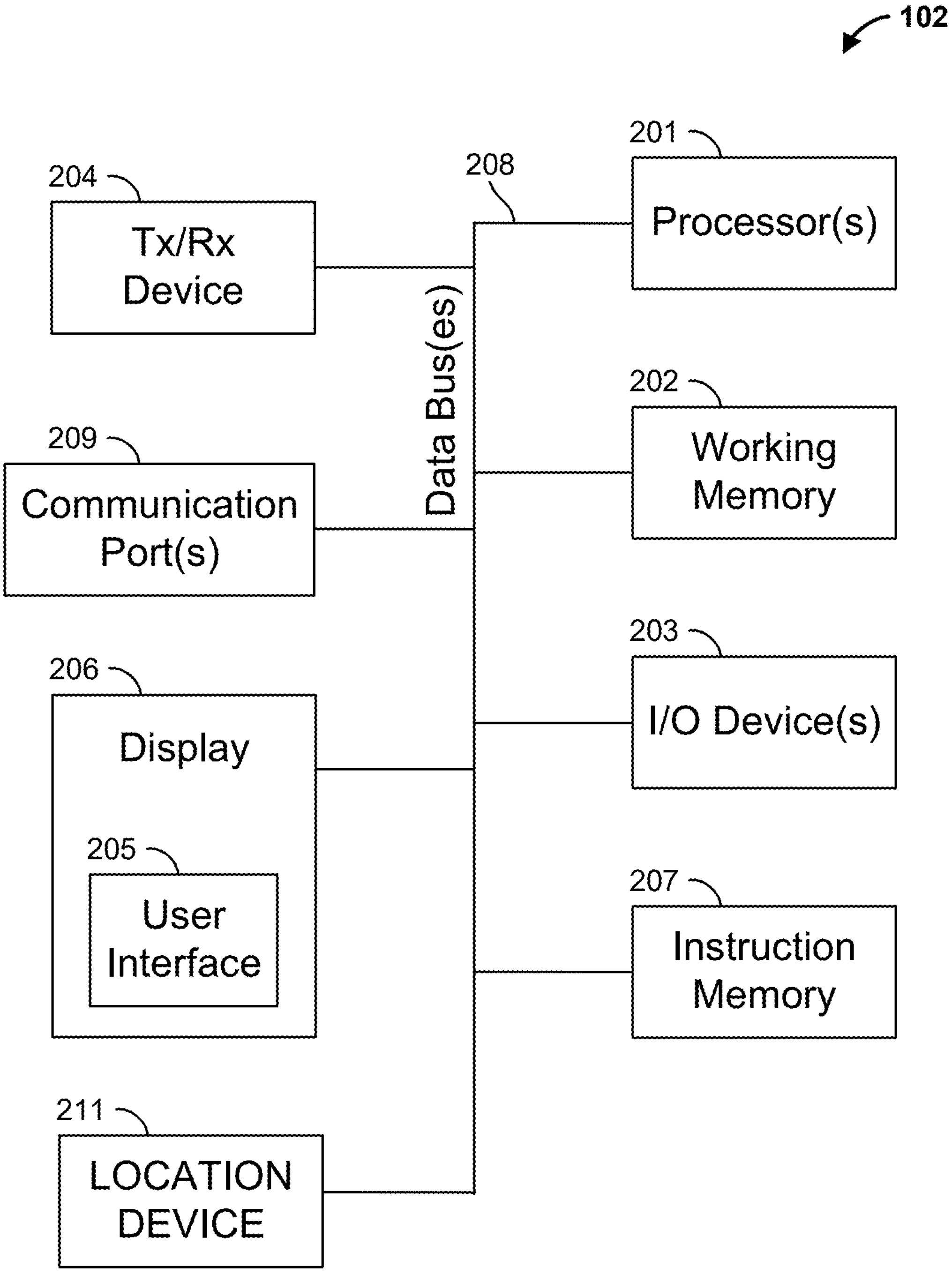
FIG. 2 is a block diagram of a data reliability computing device, in accordance with some embodiments of the present teaching.

FIG. 2 illustrates a block diagram of a data reliability computing device, e.g. the data reliability computing device 102 of FIG. 1, in accordance with some embodiments of the present teaching. In some embodiments, each of the data reliability computing device 102, the server 104, the workstation(s) 106, the multiple user computing devices 110, 112, 114, and the one or more processing devices 120 in FIG. 1 may include the features shown in FIG. 2. Although FIG. 2 is described with respect to certain components shown therein, it will be appreciated that the elements of the data reliability computing device 102 can be combined, omitted, and/or replicated. In addition, it will be appreciated that additional elements other than those illustrated in FIG. 2 can be added to the data reliability computing device 102.

As shown in FIG. 2, the data reliability computing device 102 can include one or more processors 201, an instruction memory 207, a working memory 202, one or more input/output devices 203, one or more communication ports 209, a transceiver 204, a display 206 with a user interface 205, and an optional location device 211, all operatively coupled to one or more data buses 208. The data buses 208 allow for communication among the various components. The data buses 208 can include wired, or wireless, communication channels.

The one or more processors 201 can include any processing circuitry operable to control operations of the data reliability computing device 102. In some embodiments, the one or more processors 201 include one or more distinct processors, each having one or more cores (e.g., processing circuits). Each of the distinct processors can have the same or different structure. The one or more processors 201 can include one or more central processing units (CPUs), one or more graphics processing units (GPUs), application specific integrated circuits (ASICs), digital signal processors (DSPs), a chip multiprocessor (CMP), a network processor, an input/output (I/O) processor, a media access control (MAC) processor, a radio baseband processor, a co-processor, a microprocessor such as a complex instruction set computer (CISC) microprocessor, a reduced instruction set computing (RISC) microprocessor, and/or a very long instruction word (VLIW) microprocessor, or other processing device. The one or more processors 201 may also be implemented by a controller, a microcontroller, an application specific integrated circuit (ASIC), a field programmable gate array (FPGA), a programmable logic device (PLD), etc.

In some embodiments, the one or more processors 201 are configured to implement an operating system (OS) and/or various applications. Examples of an OS include, for example, operating systems generally known under various trade names such as Apple macOS™, Microsoft Windows™, Android™, Linux™, and/or any other proprietary or open-source OS. Examples of applications include, for example, network applications, local applications, data input/output applications, user interaction applications, etc.

The instruction memory 207 can store instructions that can be accessed (e.g., read) and executed by at least one of the one or more processors 201. For example, the instruction memory 207 can be a non-transitory, computer-readable storage medium such as a read-only memory (ROM), an electrically erasable programmable read-only memory (EEPROM), flash memory (e.g. NOR and/or NAND flash memory), content addressable memory (CAM), polymer memory (e.g., ferroelectric polymer memory), phase-change memory (e.g., ovonic memory), ferroelectric memory, silicon-oxide-nitride-oxide-silicon (SONOS) memory, a removable disk, CD-ROM, any non-volatile memory, or any other suitable memory. The one or more processors 201 can be configured to perform a certain function or operation by executing code, stored on the instruction memory 207, embodying the function or operation. For example, the one or more processors 201 can be configured to execute code stored in the instruction memory 207 to perform one or more of any function, method, or operation disclosed herein.

Additionally, the one or more processors 201 can store data to, and read data from, the working memory 202. For example, the one or more processors 201 can store a working set of instructions to the working memory 202, such as instructions loaded from the instruction memory 207. The one or more processors 201 can also use the working memory 202 to store dynamic data created during one or more operations. The working memory 202 can include, for example, random access memory (RAM) such as a static random access memory (SRAM) or dynamic random access memory (DRAM), Double-Data-Rate DRAM (DDR-RAM), synchronous DRAM (SDRAM), an EEPROM, flash memory (e.g. NOR and/or NAND flash memory), content addressable memory (CAM), polymer memory (e.g., ferroelectric polymer memory), phase-change memory (e.g., ovonic memory), ferroelectric memory, silicon-oxide-nitride-oxide-silicon (SONOS) memory, a removable disk, CD-ROM, any non-volatile memory, or any other suitable memory. Although embodiments are illustrated herein including separate instruction memory 207 and working memory 202, it will be appreciated that the data reliability computing device 102 can include a single memory unit configured to operate as both instruction memory and working memory. Further, although embodiments are discussed herein including non-volatile memory, it will be appreciated that the data reliability computing device 102 can include volatile memory components in addition to at least one non-volatile memory component.

In some embodiments, the instruction memory 207 and/or the working memory 202 includes an instruction set, in the form of a file for executing various methods, e.g. any method as described herein. The instruction set can be stored in any acceptable form of machine-readable instructions, including source code or various appropriate programming languages. Some examples of programming languages that can be used to store the instruction set include, but are not limited to: Java, JavaScript, C, C++, C#, Python, Objective-C, Visual Basic, .NET, HTML, CSS, SQL, NoSQL, Rust, Perl, etc. In some embodiments a compiler or interpreter is configured to convert the instruction set into machine executable code for execution by the one or more processors 201.

The input-output devices 203 can include any suitable device that allows for data input or output. For example, the input-output devices 203 can include one or more of a keyboard, a touchpad, a mouse, a stylus, a touchscreen, a physical button, a speaker, a microphone, a keypad, a click wheel, a motion sensor, a camera, and/or any other suitable input or output device.

The transceiver 204 and/or the communication port(s) 209 allow for communication with a network, such as the communication network 118 of FIG. 1. For example, if the communication network 118 of FIG. 1 is a cellular network, the transceiver 204 is configured to allow communications with the cellular network. In some embodiments, the transceiver 204 is selected based on the type of the communication network 118 the data reliability computing device 102 will be operating in. The one or more processors 201 are operable to receive data from, or send data to, a network, such as the communication network 118 of FIG. 1, via the transceiver 204.

The communication port(s) 209 may include any suitable hardware, software, and/or combination of hardware and software that is capable of coupling the data reliability computing device 102 to one or more networks and/or additional devices. The communication port(s) 209 can be arranged to operate with any suitable technique for controlling information signals using a desired set of communications protocols, services, or operating procedures. The communication port(s) 209 can include the appropriate physical connectors to connect with a corresponding communications medium, whether wired or wireless, for example, a serial port such as a universal asynchronous receiver/transmitter (UART) connection, a Universal Serial Bus (USB) connection, or any other suitable communication port or connection. In some embodiments, the communication port(s) 209 allows for the programming of executable instructions in the instruction memory 207. In some embodiments, the communication port(s) 209 allow for the transfer (e.g., uploading or downloading) of data, such as machine learning model training data.

In some embodiments, the communication port(s) 209 are configured to couple the data reliability computing device 102 to a network. The network can include local area networks (LAN) as well as wide area networks (WAN)

including without limitation Internet, wired channels, wireless channels, communication devices including telephones, computers, wire, radio, optical and/or other electromagnetic channels, and combinations thereof, including other devices and/or components capable of/associated with communicating data. For example, the communication environments can include in-body communications, various devices, and various modes of communications such as wireless communications, wired communications, and combinations of the same.

In some embodiments, the transceiver 204 and/or the communication port(s) 209 are configured to utilize one or more communication protocols. Examples of wired protocols can include, but are not limited to, Universal Serial Bus (USB) communication, RS-232, RS-422, RS-423, RS-485 serial protocols, FireWire, Ethernet, Fibre Channel, MIDI, ATA, Serial ATA, PCI Express, T-1 (and variants), Industry Standard Architecture (ISA) parallel communication, Small Computer System Interface (SCSI) communication, or Peripheral Component Interconnect (PCI) communication, etc. Examples of wireless protocols can include, but are not limited to, the Institute of Electrical and Electronics Engineers (IEEE) 802.xx series of protocols, such as IEEE 802.11a/b/g/n/ac/ag/ax/be, IEEE 802.16, IEEE 802.20, GSM cellular radiotelephone system protocols with GPRS, CDMA cellular radiotelephone communication systems with 1×RTT, EDGE systems, EV-DO systems, EV-DV systems, HSDPA systems, Wi-Fi Legacy, Wi-Fi 1/2/3/4/5/6/6E, wireless personal area network (PAN) protocols, Bluetooth Specification versions 5.0, 6, 7, legacy Bluetooth protocols, passive or active radio-frequency identification (RFID) protocols, Ultra-Wide Band (UWB), Digital Office (DO), Digital Home, Trusted Platform Module (TPM), ZigBee, etc.

The display 206 can be any suitable display, and may display the user interface 205. For example, the user interfaces 205 can enable user interaction with the data reliability computing device 102 and/or the server 104. For example, the user interface 205 can be a user interface for an application of a network environment operator that allows a customer to view and interact with the operator's website. In some embodiments, a user can interact with the user interface 205 by engaging the input-output devices 203. In some embodiments, the display 206 can be a touchscreen, where the user interface 205 is displayed on the touchscreen.

The display 206 can include a screen such as, for example, a Liquid Crystal Display (LCD) screen, a light-emitting diode (LED) screen, an organic LED (OLED) screen, a movable display, a projection, etc. In some embodiments, the display 206 can include a coder/decoder, also known as Codecs, to convert digital media data into analog signals. For example, the visual peripheral output device can include video Codecs, audio Codecs, or any other suitable type of Codec.

The optional location device 211 may be communicatively coupled to a location network and operable to receive position data from the location network. For example, in some embodiments, the location device 211 includes a GPS device configured to receive position data identifying a latitude and longitude from one or more satellites of a GPS constellation. As another example, in some embodiments, the location device 211 is a cellular device configured to receive location data from one or more localized cellular towers. Based on the position data, the data reliability computing device 102 may determine a local geographical area (e.g., town, city, state, etc.) of its position.

In some embodiments, the data reliability computing device 102 is configured to implement one or more modules or engines, each of which is constructed, programmed, configured, or otherwise adapted, to autonomously carry out a function or set of functions. A module/engine can include a component or arrangement of components implemented using hardware, such as by an application specific integrated circuit (ASIC) or field-programmable gate array (FPGA), for example, or as a combination of hardware and software, such as by a microprocessor system and a set of program instructions that adapt the module/engine to implement the particular functionality, which (while being executed) transform the microprocessor system into a special-purpose device. A module/engine can also be implemented as a combination of the two, with certain functions facilitated by hardware alone, and other functions facilitated by a combination of hardware and software. In certain implementations, at least a portion, and in some cases, all, of a module/engine can be executed on the processor(s) of one or more computing platforms that are made up of hardware (e.g., one or more processors, data storage devices such as memory or drive storage, input/output facilities such as network interface devices, video devices, keyboard, mouse or touchscreen devices, etc.) that execute an operating system, system programs, and application programs, while also implementing the engine using multitasking, multi-threading, distributed (e.g., cluster, peer-peer, cloud, etc.) processing where appropriate, or other such techniques. Accordingly, each module/engine can be realized in a variety of physically realizable configurations, and should generally not be limited to any particular implementation exemplified herein, unless such limitations are expressly called out. In addition, a module/engine can itself be composed of more than one sub-modules or sub-engines, each of which can be regarded as a module/engine in its own right. Moreover, in the embodiments described herein, each of the various modules/engines corresponds to a defined autonomous functionality; however, it should be understood that in other contemplated embodiments, each functionality can be distributed to more than one module/engine. Likewise, in other contemplated embodiments, multiple defined functionalities may be implemented by a single module/engine that performs those multiple functions, possibly alongside other functions, or distributed differently among a set of modules/engines than specifically illustrated in the embodiments herein.

Figure 3:
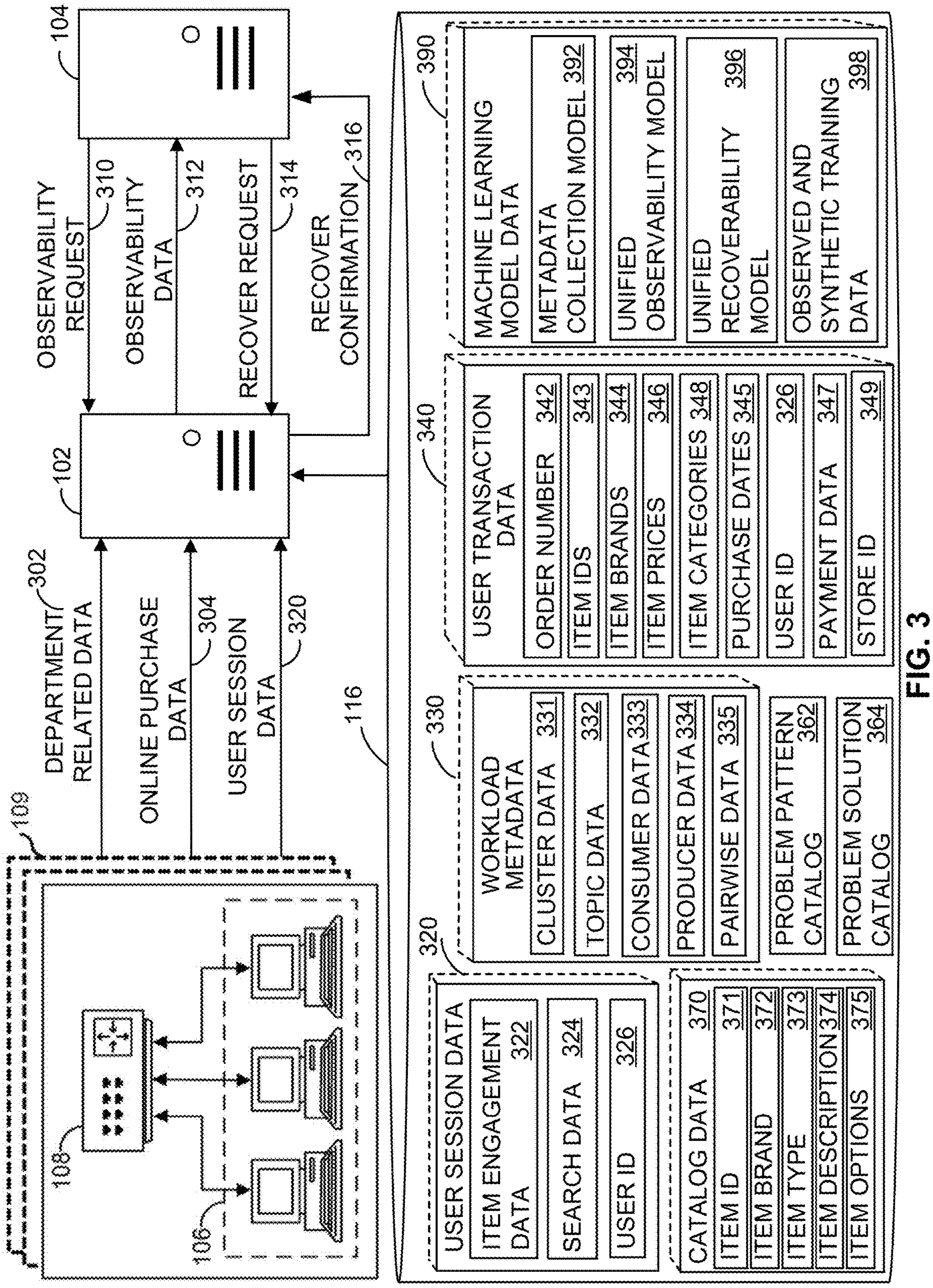
FIG. 3 is a block diagram illustrating various portions of a system for automatically identifying and resolving problem instances in data service workloads, in accordance with some embodiments of the present teaching.

FIG. 3 is a block diagram illustrating various portions of a system for automatically identifying and resolving problem instances in data service workloads, e.g. the system shown in the network environment 100 of FIG. 1, in accordance with some embodiments of the present teaching. As indicated in FIG. 3, the data reliability computing device 102 may receive user session data 320 from the departments 109 (e.g. an e-commerce department 109), and store the user session data 320 in the database 116. The user session data 320 may identify, for each user (e.g., customer, engineer or manager), data related to that user's browsing session, such as when browsing a retailer's webpage or API.

In some examples, the user session data 320 may include item engagement data 322, search data 324, and user ID 326 (e.g., a customer ID, manager ID, retailer website login ID, a cookie ID, etc.). The item engagement data 322 may include one or more of a session ID (i.e., a website browsing session identifier), item clicks identifying items which a user clicked (e.g., images of items for purchase, keywords to filter reviews for an item), items added-to-cart identifying items added to the user's online shopping cart, advertisements viewed identifying advertisements the user viewed during the browsing session, and advertisements clicked identifying advertisements the user clicked on. The search data 324 may identify one or more searches conducted by a user during a browsing session (e.g., a current browsing session).

The data reliability computing device 102 may also receive online purchase data 304 from the e-commerce department 109, which identifies and characterizes one or more online purchases, such as purchases made by the user and other users via a retailer's website hosted by the e-commerce department 109. The data reliability computing device 102 may also receive department related data 302 from the one or more departments 109, which identifies and characterizes transactions, inventory and other retail related data in those departments 109.

The department related data 302 and the online purchase data 304 may be parsed to generate user transaction data 340. The data reliability computing device 102 may obtain metadata regarding the user transaction data 340 exchanged among sub-systems of the system. In this example, the user transaction data 340 may include, for each purchase, one or more of: an order number 342 identifying a purchase order, item IDs 343 identifying one or more items purchased in the purchase order, item brands 344 identifying a brand for each item purchased, item prices 346 identifying the price of each item purchased, item categories 348 identifying a product type (or category) of each item purchased, purchase dates 345 identifying the purchase dates of the purchase orders, a user ID 326 for the user making the corresponding purchase, payment data 347 indicating payment methods and related information (e.g. emails associated with payment) for corresponding online orders, and store ID 349 for the corresponding in-store purchase, or for the pickup store or shipping-from store associated with the corresponding online purchase.

In some embodiments, the database 116 may further store catalog data 370, which may identify one or more attributes of a plurality of items, such as a portion of or all items a retailer carries in stores and/or at e-commerce platforms. The catalog data 370 may identify, for each of the plurality of items, an item ID 371 (e.g., an SKU number), item brand 372, item type 373 (e.g., grocery item such as milk, clothing item), item description 374 (e.g., a description of the product including product features, such as ingredients, benefits, use or consumption instructions, or any other suitable description), and item options 375 (e.g., item colors, sizes, flavors, etc.).

In some embodiments, the database 116 may also store a problem pattern catalog 362 identifying a list of known problem patterns that could happen in workloads. In some embodiments, the problem pattern catalog 362 includes but not limited to the following problem patterns: a juggler pattern where a workload is deployed with a less number of consumer instances across consumer applications than a total number of partitions from which messages are to be consumed; a time slicer pattern where a workload is deployed with consumer applications provisioned with a less number of processor cores than a number of consumer instances configured per consumer application; a headline pattern where a same topic in a workload is consumed by multiple consumer applications more than a predetermined threshold; a know-all pattern where one consumer application is consuming from multiple topics more than a predetermined threshold; a quiescent topic pattern where a topic is not consumed by any consumer application for a time period longer than a predetermined threshold; and a diehard client pattern where a client application is implemented using an unsupported version of client library. In some embodiments, the database 116 may also store a problem solution catalog 364 identifying a list of known problem solutions each configured to resolve a respective one of the known problem patterns in the problem pattern catalog 362. In some embodiments, one or more of the thresholds used to define the problem patterns can be determined and updated based on a machine learning model and updated training data.

In some embodiments, the database 116 may further store workload metadata 330, which may identify metadata of workloads of a data service platform integrating the client applications from the different departments 109, such as e-commerce application, in-store application, supply chain application, search application, advertisement application, etc. of a retailer network. The workload metadata 330 may identify, for workloads of a data service platform, cluster data 331 indicating data of clusters in the workloads, topic data 332 indicating data of topics hosted on the clusters, consumer data 333 indicating data of consumer applications consuming messages with the topics, producer data 334 indicating data of producer applications producing the messages with the topics, and pairwise data 335 indicating data of metadata pairs, e.g. a pair of (cluster, topic), a pair of (cluster, consumer group), etc.

The database 116 may also store machine learning model data 390 identifying and characterizing one or more models and related data for automatically identifying and resolving problem instances in data service workloads. For example, the machine learning model data 390 may include: a metadata collection model 392, a unified observability model 394, a unified recoverability model 396, and observed and synthetic training data 398. In various embodiments, the machine learning model data 390 includes any number of the metadata collection model(s) 392, the unified observability model(s) 394, and the unified recoverability model(s) 396.

The metadata collection model 392 in this example can be used to collect various metadata related to clusters, topics, consumers, producers and other attributes of the data service platform. The metadata collection model 392 may be a machine learning model developed based on diverse datasets. For example, the metadata collection model 392 may be developed by leveraging hierarchical, geographical, and linear/non-linear relationships in diverse datasets at different locations, to automatically collect these datasets for unified observability and recoverability.

The unified observability model 394 in this example can be used to determine whether a problem pattern exists in a workload based on the problem pattern catalog 362 and metadata of the workload. For example, the system can use the unified observability model 394 to detect live facts and events that follow a predetermined problem pattern, and identify the workloads including these problematic facts and events. The system can create a problem record for each problem instance in the detected problematic workloads, and store the problem records in a database, e.g. the database 116.

The unified recoverability model 396 can be used to determine a problem solution for each problem instance identified by the unified observability model 394 in a workload, and execute the problem solution including operations across one or more client applications in one or more data service platforms. In some examples, the problem solution may be determined by selecting, from the problem solution catalog 364, a problem solution corresponding to the problem instance identified. In some examples, the unified recoverability model 396 is a machine learning model configured to determine the problem solution directly based on the metadata of the problematic workload. In accordance with a determination that the problem instance is resolved by the problem solution, the system can generate a notification that the workload is recovered. In some examples, the unified recoverability model 396 may be trained to minimize a mean squared error (MSE) reconstruction loss with weights and hyperparameters updated through back propagation.

The observed and synthetic training data 398 may include data utilized for training one or more of the metadata collection model 392, the unified observability model 394, and the unified recoverability model 396. In some examples, the observed and synthetic training data 398 may be formed based on: a predetermined set of problem patterns, a predetermined set of problem solutions, historical or labelled detected problem instances, historical or labelled problem solutions. In some examples, the observed and synthetic training data 398 comprises data related to metadata collected by the metadata collection model 392.

In some examples, the data reliability computing device 102 receives an observability request 310 from the server 104. The observability request 310 may seek observability data 312 of any existing problem pattern in the workloads of a data service platform. In some examples, the observability request 310 is triggered by an associate or an engineer of a corporation, and the observability data 312 is provided to the associate or engineer to track data performance of the data service platform. In some embodiments, the data reliability computing device 102 may use the unified observability model 394 to identify problem instances in the workloads based on predetermined problem patterns, and generate the observability data 312 based on the identified problem instances. In response to the observability request 310, the data reliability computing device 102 transmits the observability data 312 to the server 104.

In some examples, the data reliability computing device 102 receives a recover request 314 from the server 104. The recover request 314 may seek a confirmation of workload recovery for an observed problem instance. In some examples, the recover request 314 is triggered by an associate or an engineer of a corporation, or triggered automatically upon a detection of the problematic workload. In some embodiments, the data reliability computing device 102 may use the unified recoverability model 396 to determine a problem solution for the observed problem instance, and execute the problem solution to recover the corresponding problematic workload. Then, the data reliability computing device 102 can generate a recover confirmation 316 in accordance with a determination that the observed problem instance is resolved by the problem solution. In response to the recover request 314, the data reliability computing device 102 transmits the recover confirmation 316 to the server 104.

In some embodiments, the data reliability computing device 102 may assign one or more of the above described operations to a different processing unit or virtual machine hosted by one or more processing devices 120. Further, the data reliability computing device 102 may obtain the outputs of the these assigned operations from the processing units, and generate the observability data 312 and/or the recover confirmation 316 based on the outputs.

Figure 4:
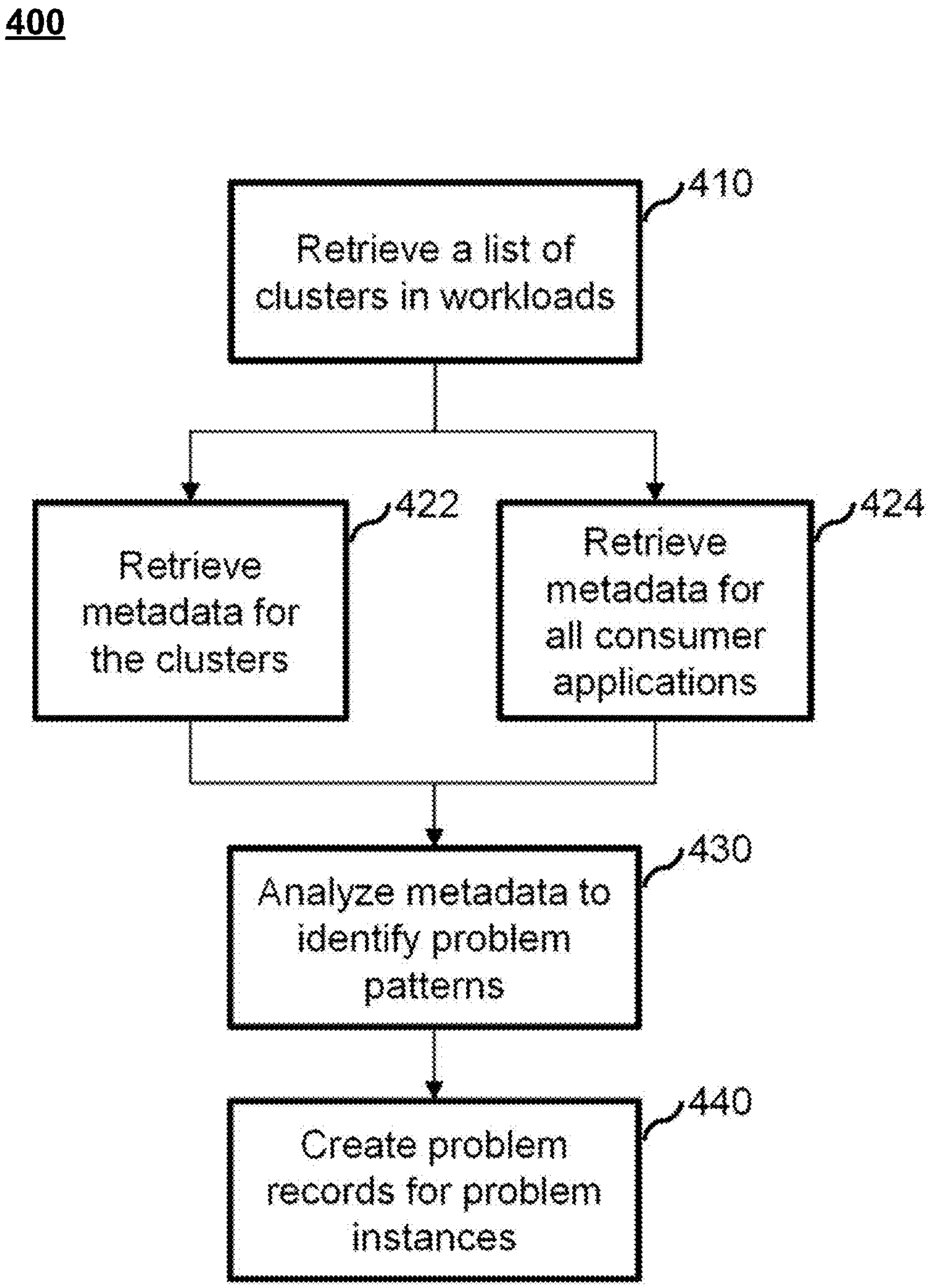
FIG. 4 illustrates an exemplary process for unified observability of problem instances, in accordance with some embodiments of the present teaching.

FIG. 4 illustrates an exemplary process 400 for unified observability of problem instances, in accordance with some embodiments of the present teaching. In some embodiments, the process 400 can be carried out by one or more computing devices, such as the data reliability computing device 102, and/or the cloud-based engine 121 of FIG. 1.

As shown in FIG. 4, the process 400 begins from operation 410, where a list of clusters are retrieved. For example, the entire list of clusters and client applications deployed in workloads of a network can be retrieved. Then the process 400 goes to operations 422 and 424 in parallel.

At operation 422, metadata for the clusters are retrieved. For example, the system can retrieve the metadata for the clusters, topics hosted on the clusters, and consumer groups consuming from those topics. In some embodiments, some of the metadata includes a number of partitions of a topic, a list of consumer groups consuming from a topic, configurations of clusters and topics, etc. The process then goes to operation 430.

At operation 424, metadata for all consumer applications are retrieved. For example, the system can retrieve the metadata for all the consumer applications deployed in the application deployment platforms, such as pods or virtual machines (VMs), the application instances are running, a number of cores available to the pod/VM, etc. The process then goes to operation 430.

At operation 430, metadata is analyzed to identify problem patterns. For example, the system can analyze, for each known problem pattern, the metadata pertaining to workloads collected in the previous operations in the process 400 and determine the workloads that suffer from the problem pattern. A problem instance is identified for each workload suffering from a corresponding problem pattern.

Then at operation 440, problem records are created for the problem instances identified at the operation 430. For example, for each workload, if it is found to be suffering from a problem pattern, the system can create a problem record for that instance, and store the problem record in a database, e.g. a problem instance data store, which may be part of the database 116 or a standalone database.

Figure 5:
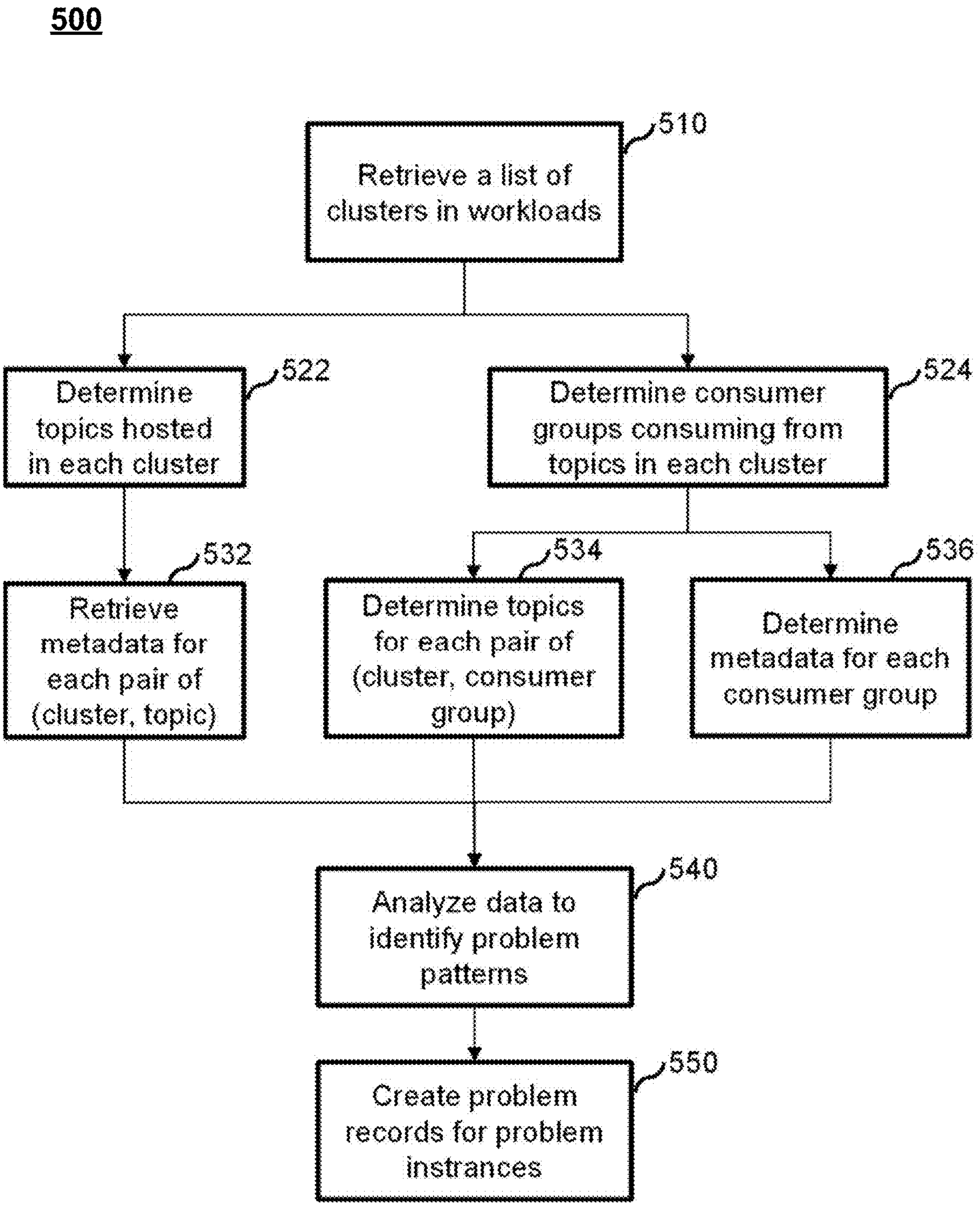
FIG. 5 illustrates another exemplary process for unified observability of problem instances, in accordance with some embodiments of the present teaching.

FIG. 5 illustrates another exemplary process 500 for unified observability of problem instances, in accordance with some embodiments of the present teaching. In some embodiments, the process 500 can be carried out by one or more computing devices, such as the data reliability computing device 102, and/or the cloud-based engine 121 of FIG. 1.

In some embodiments, to provide observability into potential problems or problem patterns that might turn into production incidents, the system pulls a variety of data from various data sources. The process 500 includes a sequence of steps describing what data is fetched from which data sources and how they are used to determine the presence of problem patterns in data platform workloads.

As shown in FIG. 5, the process 500 begins from operation 510, where the system retrieves a list of clusters in workloads. For example, the entire list of clusters deployed in workloads of a network can be retrieved. Then the process 500 goes to operations 522 and 524 in parallel.

At operation 522, topics hosted in each cluster are determined. For example, for each cluster, the system can populate a list of topics hosted in the cluster. The process then goes to operation 532, where metadata for each pair of (cluster, topic) are retrieved. For example, for each (cluster, topic) pair including a corresponding cluster and a corresponding topic, the system can retrieve the details such as number of partitions, partitions assignment strategy, list of consumer groups consuming from it, etc. Then, the process goes to operation 540.

At operation 524, consumer groups consuming from topics in each cluster are determined. For example, for each cluster, the system can populate a list of consumer groups consuming from the topics hosted in the cluster. The process then goes to operations 534 and 536 in parallel. At operation 534, topics for each pair of (cluster, consumer group) are determined. For example, for each (cluster, consumer group) pair including a corresponding cluster and a corresponding consumer group, the system can identify a list of topics from which the consumer group consuming the messages. At operation 536, metadata for each consumer group are determined. For example, for each consumer group, the system can identify the number of pods/VMs the application instances are running, version of the client library used, number of consumer instances (number of threads) configured, and the number of cores available to each pod/VM. After each of the operations 534 and 536, the process goes to operation 540.

At operation 540, data is analyzed to identify problem patterns. For example, for each problem pattern, the system can analyze the data pertaining to the workloads collected from the previous operations in the process 500 and determine the workloads that suffer from the problem pattern. A problem instance may be identified for each workload suffering from a corresponding problem pattern.

Then at operation 550, problem records are created for the problem instances identified at the operation 540. For example, for each workload, if it is found to be suffering from a problem pattern, the system can create a problem record for that workload under a concerned problem pattern bucket, and store the problem record in a database, e.g. a problem instance data store, which may be part of the database 116 or a standalone database. In some embodiments, the system can attach a list of suitable automated SOPs to each problem record, such that a user can choose and remediate the problem to prevent or recover the workload from the incidents.

In various embodiments, the processes 400 and 500 may be performed for unified observability of live facts and events around incidents during a production stage of a data service platform, or for unified observability of problematic workloads during a development stage of a data service platform.

In some embodiments, unified observability of live events and facts around incidents being handled is available when an incident is predicted or on-demand when a user needs it. For example, the system can subscribe to all the alert sources for getting notified of all the consumer lag alerts and pre-alerts regarding the data service platform. Whenever a consumer lag alert or pre-alert is received, or when the user looks for unified observability around the workloads, the system starts retrieving and recording the related metrics from various metrics and observability data sources of underlying platform services, and other observability systems. These metrics are analyzed to determine the source and cause of the lag.

In some embodiments, some metrics, such as incoming messages per second, CPU utilization of the consumer application, are always available, which the system leverages to present to the user and to analyze and determine if there are variations in these trends when compared to current time and before the time of lag. As long as the incident is open, system continues to retrieve all the related metrics and data that will be helpful to investigate the incident.

For example, for an incident where a consumer application is facing consumer lag issue, the system provides unified observability into the problem. Knowing the partitions that make up the topic and the application instances each consuming the subset of partitions, system pulls data from all kinds of underlying data platform services and provides the wholistic view of which application instance consumes from which partition, resource and health status of both partitions and application instances, and potential issues on either side and present the same to the user.

In some embodiments, for each problem instance identified for a workload, the system automatically determines, e.g. using at least one machine learning model, a problem solution based on the problem instance and a catalog of problem solutions. The system can execute the problem solution including operations across one or more data service platforms associated with the workload, and recover the workload in accordance with a determination that the problem instance is resolved by the problem solution.

In some embodiments, the problem solution may follow a recoverability standard operating procedure (SOP). Different recoverability SOPs can be implemented using business process management (BPM) workflows. In some examples, the SOPs are fully automated and appropriate SOPs are available for fixing the problems both proactively ahead of any incidents and reactively during the incidents.

In some examples, each workflow includes a sequence of steps, which use administrative and/or operations APIs of the underlying platform services, and other recoverability platforms. As the BPM workflows are executed, various steps are orchestrated across various platform services based on the defined workflow to achieve the result recovery.

As such, the system provides both unified observability and unified recoverability mechanisms. The unified observability provides observability into (i) potential problems that might result into production incidents, which is helpful for proactively fixing the issues and preventing incidents, and (ii) other facts and events that have resulted in an ongoing incident, which helps in taking right decisions and actions to recover from the ongoing incident. The unified recoverability mechanisms (e.g. SOPs) can orchestrate multiple recoverability actions across multiple involved platform services, and are available for both (i) proactively scanning and fixing the potential problems for preventing the data platform workloads from encountering production incidents before the fact, and ii) reactively recovering from the production incidents quickly after the fact that a data platform workload has encountered an incident. The SOPs are fully automated and are co-located appropriately with the problems that need to be fixed, where contextual data may be provided as well.

Figure 6:
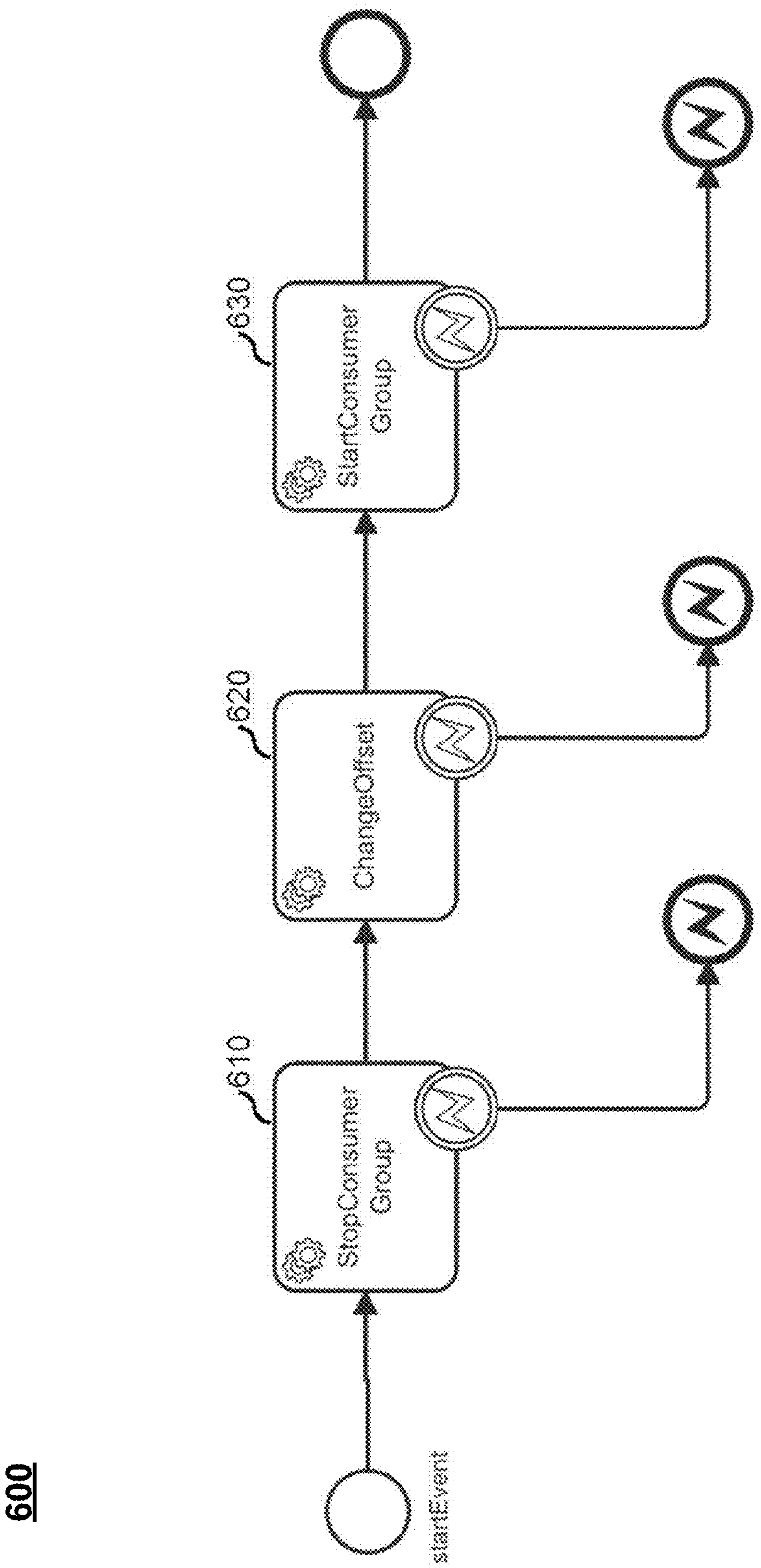
FIG. 6 illustrates an exemplary process for unified recoverability of workloads with problem instances, in accordance with some embodiments of the present teaching.

FIG. 6 illustrates an exemplary process 600 for unified recoverability of workloads with problem instances, e.g. by conducting an offset reset SOP, in accordance with some embodiments of the present teaching. In some embodiments, the process 600 can be carried out by one or more computing devices, such as the data reliability computing device 102, and/or the cloud-based engine 121 of FIG. 1.

As shown in FIG. 6, the process 600 starts from operation 610, where the system automatically stops the consumer group (a group of one or more consumer applications) if it is running, e.g. using API provided by the data service platform. Then at operation 620, the system waits for the consumer group to move to an inactive state, e.g. using APIs provided by the data service platform for determining the status. After ensuring the consumer group is transitioned to a required state (e.g. a stable and active state), the system executes offset reset operation using API provided by the data service platform. Then, at operation 630, the system automatically starts the application again if it was running previously, again using the API provided by the data service platform, to complete the SOP execution. In some embodiments, the system ensures that the application is completely restarted before the production traffic can be allowed to flow into the application.

With this automated unified recoverability, instead of requiring multiple experts from multiple platform services and application teams to do their parts of overall recoverability solution in an orchestrating manner, the system can automatically execute the problem solution SOP to achieve the recovery to avoid time-consuming and error-prone activity.

Figure 7:
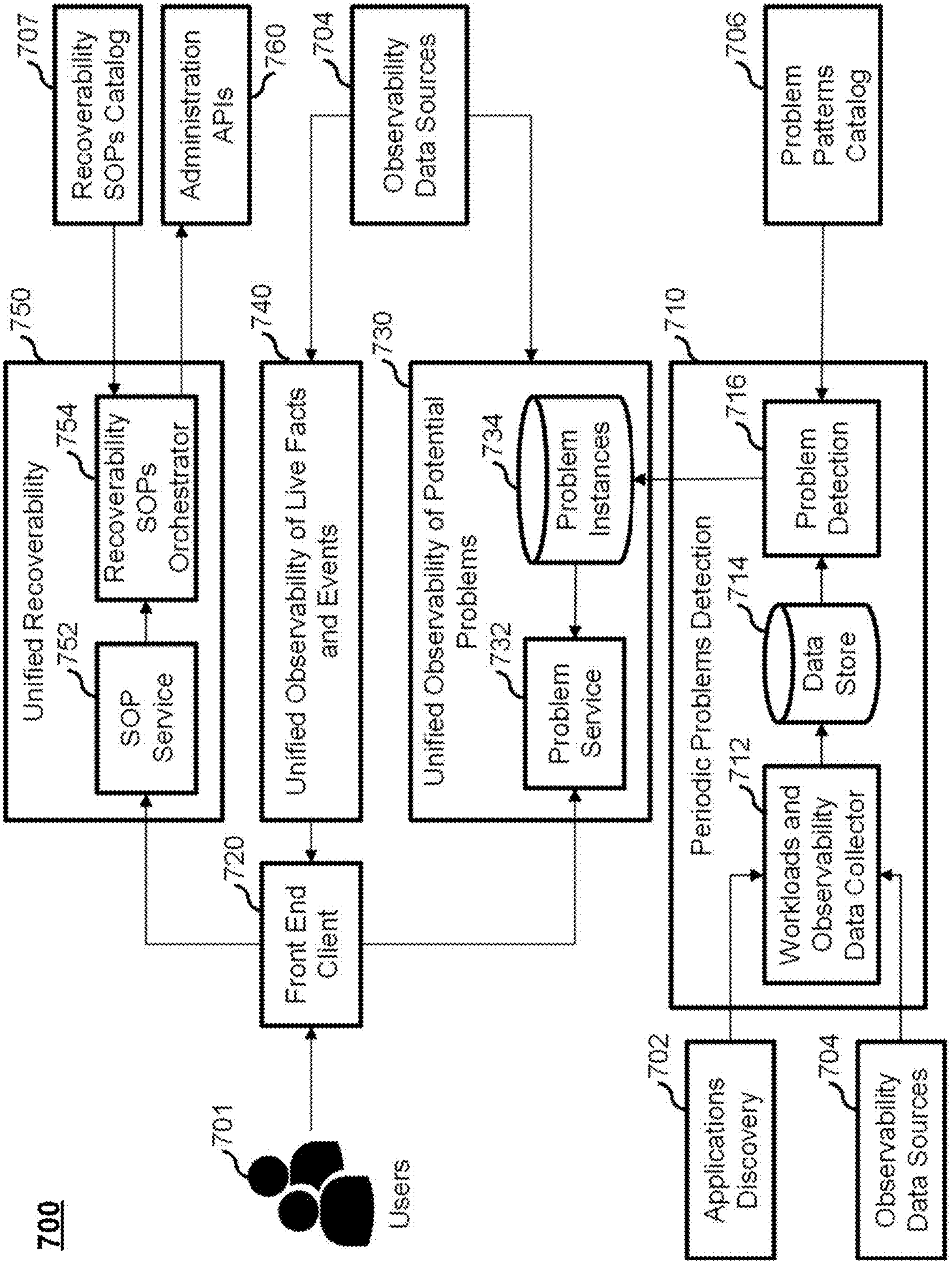
FIG. 7 illustrates an exemplary architecture for unified observability and recoverability of workloads, in accordance with some embodiments of the present teaching.

FIG. 7 illustrates an exemplary architecture 700 for unified observability and recoverability of workloads, in accordance with some embodiments of the present teaching. In some embodiments, the architecture 700 indicates a process that can be carried out by one or more computing devices, such as the data reliability computing device 102, and/or the cloud-based engine 121 of FIG. 1.

As shown in FIG. 7, the architecture 700 includes a problem patterns catalog 706 and a recoverability SOPs catalog 707. In some embodiments, the problem patterns catalog 706 is a repository of problem patterns implemented as evaluable rules. The problem patterns in the problem patterns catalog 706 may be generated or determined based on frequently occurred past incidents. The system can also determine methods to detect the presence of these problem patterns in the entire workloads based on previously occurred incidents and/or some machine learning models. The rules may be used to evaluate given inputs against specified conditions. For example, the problem patterns catalog 706 may include rules for problem patterns of: jugglers, time slicers, deadlines, know-all, quiescent topics, diehard clients, and breath holders. In some embodiments, the problem patterns catalog 706 is generated by a catalog subsystem which supports adding more problem patterns into the problem patterns catalog 706 or updating problem patterns in the problem patterns catalog 706.

In some examples, a juggler pattern happens when a workload is deployed with a less number of consumer instances across consumer applications than a total number of partitions from which messages are to be consumed. For example, juggler workloads are those deployed with less number of consumer instances (threads) across pods than the total number of partitions from which the messages are to be consumed. When a consumer instance consumes and processes messages from multiple partitions at a time, if it stuck processing a message from one partition, messages from other partitions will not be processed promptly. Thus, all partitions that are consumed by the stuck consumer instance will have lag built up. In some examples, a lag number is a number of messages pending to be processed.

In some examples, a time slicer pattern happens when a workload is deployed with consumer applications provisioned with a less number of processor cores than a number of consumer instances configured per consumer application. For example, time slicer workloads are those deployed with pods or VMs that are provisioned with less number of CPU cores than the consumer concurrency level (number of consumer instances/threads within a pod/VM) configured per consumer application instance (pod/VM). The CPU-bound consumer instances (threads) will be continuously starving for CPU resources while other threads utilize a CPU core, leading to lag build up on all partitions due to resource scarcity for the consumer instances.

In some examples, a headline pattern happens when a same topic in a workload is consumed by multiple consumer applications more than a predetermined threshold. A topic consumed by multiple consumer applications is called a headlines topic. In some business scenarios, it may be a valid requirement for multiple consumers to consume from one same topic. But having too many consumer groups consuming from one topic will lead to serviceability challenges. For example, it might be difficult to have an inventory of all consumers and to manage them collectively at once.

In some examples, a know-all pattern happens when one consumer application is consuming from multiple topics more than a predetermined threshold. A consumer consuming from multiple topics is called a know-all (or "I Know All") consumer. Depending on business requirements, this may be a valid implementation from the application design perspective. But when there are issues with any of the topics consumed by this consumer or with the consumer itself, it will lead to serviceability challenges.

In some examples, a quiescent topic pattern happens when a topic is not consumed by any consumer application for a time period longer than a predetermined threshold. That is, quiescent topics are those having no message produced to them and there are no consumers consuming from them. It may be that a quiescent topic is not used any more or that the consumers have been shut down and require to be started/restarted. In some examples, if the date on which incoming messages were noticed is more than a time period (e.g. 6 months ago) and if there are 0 or no active consumer, then the topic is flagged as a quiescent topic.

In some examples, a diehard client pattern happens when a client application is implemented using an unsupported version of client library. Client applications that are implemented using unsupported versions of client libraries are known as diehard clients. Diehard clients are prone to develop reliability issues in production due to potential bugs present with the unsupported versions of client libraries.

In some examples, a breath holder pattern identifies the consumers with problematic values for configuration properties that are used to control failure detection behavior of a data service platform. Incorrect configuration of these properties may lead to stalled consumers or state corruption.

In some embodiments, different problem patterns are classified based on different severity levels. When a workload is suffering from multiple problem patterns, the problem patterns are ranked based on their respective severity levels, e.g. using a machine learning model, such that a more severe problem pattern is given a higher priority to be resolved using a corresponding SOP.

In some embodiments, the recoverability SOPs catalog 707 in FIG. 7 is a repository of SOPs implemented as business process model and notation (BPMN) workflows. Each SOP includes a sequence of operational steps which, when executed as defined in the BPM workflow, can fulfill the required recoverability operations. In some embodiments, the recoverability SOPs catalog 707 includes SOPs for managing the applications such as start, stop, restart, scale up/down and for managing the topics and consumer groups like resetting offsets etc. In some embodiments, the system can add new SOPs using BPMN notations.

As shown in FIG. 7, the architecture 700 includes a periodic problems detection unit 710, which includes a workloads and observability data collector 712, a data store 714 and a problem detection module 716. In some embodiments, the workloads and observability data collector 712 periodically pulls, from an applications discovery data source 702 and observability data sources 704, inventory and workload data such as all the topics, consumer groups and their details; and stores the pulled data into the data store 714.

In some embodiments, the applications discovery data source 702 and the observability data sources 704 are associated with one or more data service platforms, such as Kafka®, Walmart Cloud Native Platform (WCNP), One-Ops®, etc. In some embodiments, the data store 714 may be part of the database 116 or a standalone database. In some embodiments, the periodic problems detection unit 710 further includes an agent event stream processor that subscribes to agent's event feed associated with a data service platform or data streaming platform, and populate the inventory of applications running on the platform into the data store 714 as well.

The problem detection module 716 may analyze the data (pulled by the workloads and observability data collector 712 and stored in the data store 714) using the problem pattern rules from the problem patterns catalog 706, for determining the presence of problems in the data collected. As such, the problem detection module 716 can discover problem instances and store the discovered problem instances in a problem instances database 734. In some embodiments, the analysis tasks of the problem detection module 716 are implemented as batch jobs and are executed periodically.

In some embodiments, detecting a juggler problem pattern is to identify and showcase the workloads that could encounter consumer lag issue due to imbalances in assignment of partitions to consumer instances. The presence of a juggler problem pattern signifies the possibility of a workload facing an incident due to consumer lag. In some embodiments, the data collected for detecting a juggler problem pattern includes partitions to consumer instances assignment data, which includes: topic metadata to identify the number of partitions the given topic has, consumer group metadata to identify the number of instances (threads) in total are consuming the messages from the given topic, and partition assignment strategy configured for the consumer group, or default if none configured. In some embodiments, the rules for detecting a juggler problem pattern includes: (1) if the partitions assignment strategy is anything other than round-robin assignment strategy, then the imbalances could be primarily due to the way the consumer is implemented plus the number topics and their partitions the consumer is configured to consume from; (2) in case of custom assignment strategy, the implementation determines the balanced distribution of partitions to consumer instances; (3) even with round-robin strategy, if the number of consumer instances are less than the number of partitions, some or all consumer instances may be assigned with more than one partitions to consume from, which will also introduce imbalance and latency in processing messages pertaining to co-assigned partitions; (4) irrespective of the assignment strategy, at any time, if the number of consumer instances is less than the number of partitions, then there exists a juggler problem pattern. In some embodiments, the SOPs for eliminating the possibility of incident or recovering from the incident following the juggler problem pattern include: increasing the number of pods or VMs so that additional consumer instances in new pods or VMs will get partitions co-assigned to existing instances assigned to them, hence making each instance process dedicated or fewer partitions; and if the lag was introduced due to temporary issues within a pod or consumer instances, restarting the application.

In some embodiments, detecting a time slicers problem pattern is to identify and showcase the workloads that could encounter consumer lag issue due to scarcity of CPU resources available for CPU-bound consumers. The presence of time slicers problem pattern signifies the possibility of a workload facing an incident due to consumer lag. In some embodiments, the data collected for detecting a time slicers problem pattern includes consumer instances and CPU resources (e.g. cores) data, which includes: consumer group metadata to identify the number of instances (threads) in total are consuming the messages from the given topic; deployment metadata to identify the number of pods/VMs on which the consumer app instances are deployed; and pod/VM resource capacity data to determine the number of cores available. In some embodiments, the rules for detecting a time slicers problem pattern includes: (1) determine the number of consumer instances (threads), C, across pods/VMs consume from the topic partitions; (2) determine the number of pods/VMs, P, deployed for the consumer application; (3) determine the number of consumer instances (threads) running in each pod/VM, Cp, by Cp=C/P; (4) determine the number of CPU cores available for each pod/VM; (5) if cores<Cp (consumer instances per pod), then the app is suffering from a time slicers problem pattern. In addition, if the consumer application is highly CPU-bound, then this workload is very likely to encounter consumer lag and in turn frequent rebalances due to scarcity of resources available to it during the peak productions. In some embodiments, the SOPs for eliminating the possibility of incident or recovering from the incident following the time slicers problem pattern include: increasing the number of pods or VMs (horizontal scaling) so that additional consumer instances (threads) in new pods/VMs will get their dedicated CPU resources and will be able to process the messages independent of other threads, which were previously sharing and starving for the CPU resources, hence making each consumer instance process messages with dedicated CPU resources available to it; and increasing the number of cores (vertical scaling) at deployment level so that each pod will be able to provide dedicated CPU cores for the threads running on the pods.

In some embodiments, detecting a headlines topic problem pattern is to identify and present the workloads that consume from single topic for better understanding of how various applications and services are integrated by single topic. The presence of headlines topic problem pattern signifies the serviceability challenges when the topic or all the consumers consuming from that topic need to be managed collectively. In some embodiments, the data collected for detecting a headlines topic problem pattern includes topic and consumer groups data, which includes: a list of topics hosted on a cluster obtained using administration API; for each topic, a list of consumer groups consuming from the topic obtained using the administration API; consumer application deployment details obtained from application runtime platforms. In some embodiments, the rules for detecting a headlines topic problem pattern includes: (1) for each of the topics, retrieve the list of consumer groups; (2) for each consumer groups, determine if the consumer group is active and exclude the inactive or deleted consumer groups; (3) determine the total number of consumer groups that consume from the given topic; (4) if the number of consumer groups consuming from the same topic is more than the configured acceptable number of consumer groups that can consume from same topic, then create a headlines topic problem instance to highlight the topic and all the consumer groups consuming from the topic. In some embodiments, the SOPs for managing the list of consumer applications easily to recover quickly from the incident following the headlines topic problem pattern include: stopping, starting, and/or re-starting consumer applications, where a user can select all or few consumer applications and can start/stop/restart them with a click of a button, and the user is provided with applications deployments details; and scaling up or down consumer applications, where a user can select all or few consumer applications and can scale up/down number of consumer applications instances (pods/VMs) as required, and existing scaling setting is presented to the user for determining the scale action to conduct.

In some embodiments, detecting a I-know-all problem pattern is to identify and present the workloads that consume from multiple topics for better understanding of how an application or a service is integrating with other applications/services via topics to which those applications/services are publishing the messages or events. The presence of I-know-all problem pattern indicates that there may be a chance of topic partitions vs consumer instances assignment imbalances, frequent and unnecessary rebalances of consumer applications and in turn consumer lag buildup, inefficient resource utilization requiring capacity replanning, serviceability challenges in case one of the multiple topics consumed by the app encounters production issue. In some embodiments, the data collected for detecting I-know-all problem pattern includes topic and consumer groups data, which includes: a list of consumer groups consuming from the topics hosted on a cluster obtained using administration API; for each consumer group, a list of topics from which the consumer is consuming from using administration API; topic metadata such as number of partitions, partition assignment strategy, etc.; and consumer group metadata such as consumer instances (threads across pods), consumer concurrency level (threads per pod), etc. In some embodiments, the rules for detecting a I-know-all problem pattern includes: (1) determine the total number of topics each of the consumer groups is consuming from; (2) if the number of topics a consumer group is consuming from is more than the configured acceptable number of topics a consumer group can consume from, then create a I-know-all problem instance to highlight the consumer group along with all the topics and their details such as topic partitions, etc. In some embodiments, the SOPs for fixing an incident following I-know-all problem pattern and managing the consumer application that has complex integration with other applications and services easily with insights as to which applications are integrating among them and through which topics, include: stopping, starting and/or restarting the consumer application, where a user can start/stop/restart the consumer group with a click of a button, which is useful in case the consumer application faces production issue, and the user is provided with topics-level details; and scaling up or down consumer application, where a user can scale up/down the number of consumer applications instances (pods/VMs) as required to match the topics' scalability requirements.

In some embodiments, detecting a quiescent topics problem pattern is to identify and list the topics that are safe to be deleted and reclaim the disk space associated with them. This can help the decommission team to confidently decommission the clusters that have all unused topics, and ensure that the used topics are not deleted mistakenly causing any production incidents. The quiescent topics are those that do not have any messages produced to them and there are no consumers consuming from them. In some embodiments, the data collected for detecting a quiescent topics problem pattern includes topics and consumer groups data and topic traffic data, which includes: a list of topics hosted on a cluster obtained using administration API; for each topic, a list of consumer groups consuming from the topic obtained using administration API; for each topic, date of last observed non-zero incoming messages, which is obtained from the topic metric "incoming messages per second" monitored on a daily basis. In some embodiments, the rules for detecting a quiescent topics problem pattern includes: (1) for a given topic, determine if there are any active consumers (e.g. if there is 0 consumer or there is no active consumer, then this topic could be a quiescent topic, but it is confirmed based on the evaluation of below conditions); (2) if the date on which incoming messages were noticed is more than 6 months ago, then the topic is flagged as a quiescent topic, and a corresponding problem is created. In some embodiments, the SOPs for fixing an incident following quiescent topics problem pattern and managing the consumer applications that are idle, or deleting the topics that are orphaned for long time, include: starting the consumer application, where if there are consumer groups that are inactive, then the user can start the consumer group with a click of a button; and deleting the topic, where a decommission team can use this SOP to delete the topic and reclaim the associated disk space.

In some embodiments, detecting a diehard clients problem pattern is to identify and showcase the workloads that use unsupported older versions of client libraries. The diehard clients are prone to develop reliability issues in production due to potential bugs present with the unsupported older versions of client libraries. In some embodiments, the data collected for detecting a diehard clients problem pattern includes producer and consumer applications data, which includes: producer application deployment detail and the cluster and topic to which the application is producing the messages, obtained from an agent running along with the application; consumer application deployment detail and the cluster and topic from which the application is consuming the messages, obtained from an agent running along with the application; version of the client library used by the client application, obtained from an agent running along with the application; and currently supported version of client library. In some embodiments, the rules for detecting a diehard clients problem pattern includes: if the version of client library used by an application is less than the supported version of library, a diehard clients problem instance with the application detail and connected cluster details is created. In some embodiments, the SOPs for fixing an incident following diehard clients problem pattern include: stopping, starting, and/or restarting the application, where with some older version of client libraries, if the application encounters any issue due to bugs in the library, the only way to recover from the issue, apart from the permanent solution of upgrading the application to use newer supported version, is to restart the application, and a user can start/stop/restart the producer or consumer application with a click of a button; and creating a ticket or sending an email to the application team for planning and upgrading their application to use newer supported version of client library. In case the application is constrained to use older client library because of it is connecting to older version of a data service platform, the system can plan for migrating to a newer data service platform.

As shown in FIG. 7, the architecture 700 also includes a unified observability unit 730 of potential problems. The unified observability unit 730 includes a problem service module 732 and the problem instances database 734. In some embodiments, the problem service module 732 provides APIs for front end client 720 to retrieve and present the problem instances (from the problem instances database 734) to the users 701. In some embodiments, the unified observability unit 730 also fetches relevant metrics from the platforms' observability data sources 704 and APIs.

As shown in FIG. 7, the architecture 700 further includes a unified observability unit 740 of live facts and events. In some embodiments, the unified observability unit 740 subscribes to alert sources for lag alerts and pre-alerts. Once a problem is detected, the unified observability unit 740 subscribes to all the related platforms' observability data sources 704 and collect relevant metrics (e.g. metrics related to offset statistics and time series data). The unified observability unit 740 analyzes the related data for determining the cause of the problem and provides enriched insights to the users 701 if the problem persists or until the users 701 conclude the incident analysis.

As shown in FIG. 7, the architecture 700 further includes a unified recoverability unit 750, which includes an SOP service module 752 and a recoverability SOPs orchestrator 754. In some embodiments, the unified recoverability unit 750 provides means for the users 701 to execute suitable SOPs for recovering the workloads from incidents. For example, the SOP service module 752 can use the recoverability SOPs orchestrator 754 (serving as a workflow engine) for orchestrating the SOP workflows from the recoverability SOPs catalog 707. In some embodiments, the recoverability SOPs orchestrator 754 can provide reports and/or requests via the platforms' administration APIs 760.

In some embodiments, a system having the architecture 700 can provide users with: (i) observability of problems that can lead to incidents, (ii) observability of live events and facts around the incidents being handled, and (iii) recoverability methods for preventing or recovering from the incidents.

Figure 8:
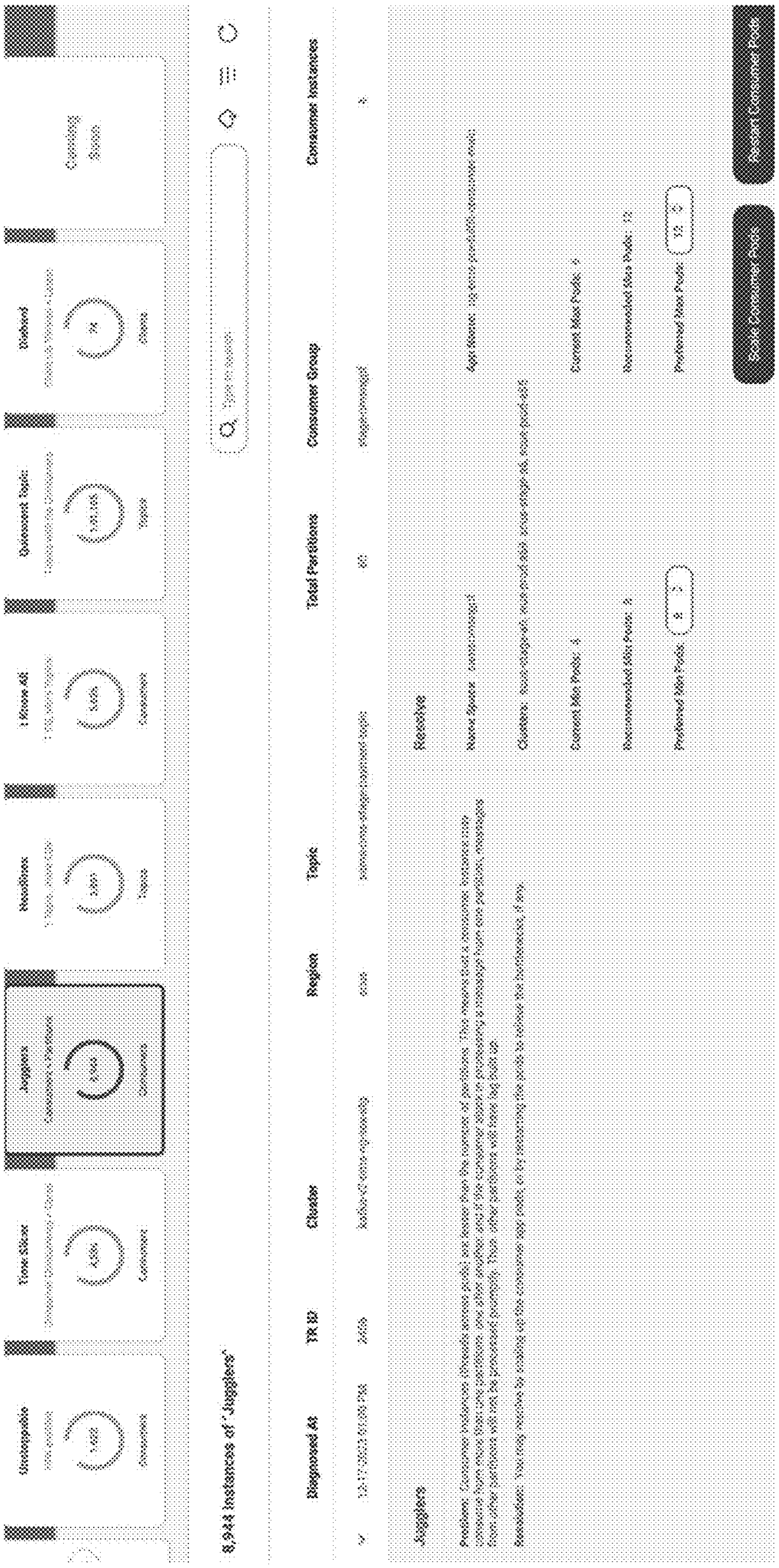
FIG. 8 illustrates an exemplary user interface for unified observability and recoverability of problematic workloads, in accordance with some embodiments of the present teaching.

FIG. 8 illustrates an exemplary user interface 800 for unified observability and recoverability of problematic workloads, in accordance with some embodiments of the present teaching. As shown in FIG. 8, the problematic workloads are categorized based on the pre-recognized problem patterns the workloads suffer from, e.g. unstoppable, time slicer, jugglers, headlines, I know all, quiescent topic, diehard, etc. In some embodiments, new problem patterns can be added into easily as and when they are recognized. For each type of the pre-recognized problem patterns, the system provides a corresponding suitable recoverability method (e.g. a relevant SOP) for preventing incidents due to the recognized problem, along with contextual data and recommendations for users to fix the problem with a click of a button.

Figure 9:
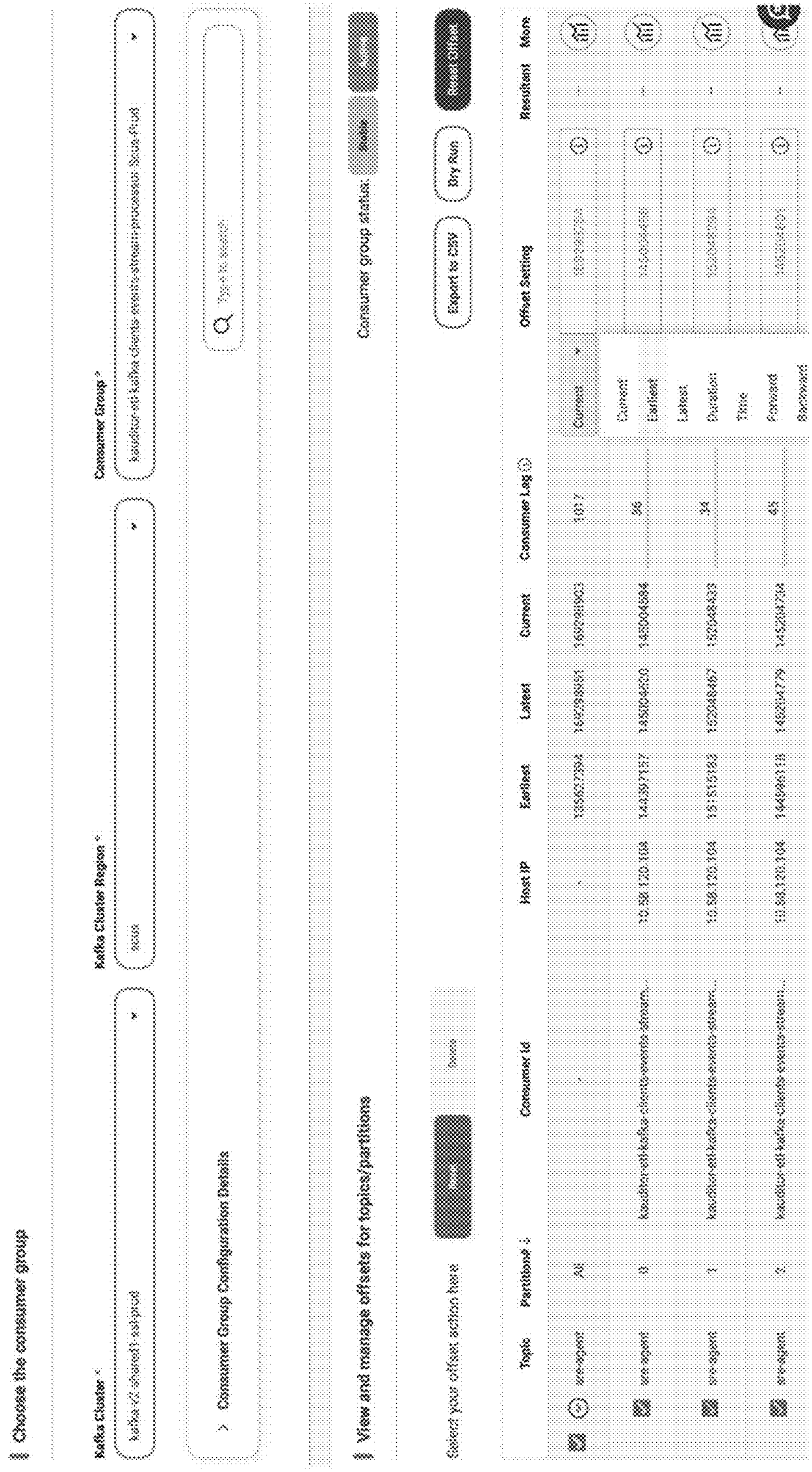
FIG. 9 illustrates an exemplary user interface for unified observability and recoverability of live events and facts, in accordance with some embodiments of the present teaching.

FIG. 9 illustrates an exemplary user interface 900 for unified observability and recoverability of live events and facts, in accordance with some embodiments of the present teaching. As shown in FIG. 9, the live events and facts around an incident being handled can be obtained from multiple platform services' observability data sources. By analyzing the live events and facts, the system can provide a suitable recoverability method for recovering from the incident.

With thousands of data platform workloads deployed in production, one of the most common production incidents with the data platform workloads is consumer lags, which occur when there is a backlog of messages and/or events waiting to be consumed and processed by consumer applications. This can lead to delays in timely processing of messages and business disruption. When such an incidence occurs, it becomes challenging to examine and pinpoint the root cause of the latency, as well as immediately remedy the issue. Although necessary information to identify the cause was accessible, it was spread over many observability platforms associated with distinct platform services, which collectively constituted a typical data platform application and required specialists from various platform services to gather insights from their respective observability tools in isolation and to obtain the ultimate insight by consolidating the insights obtained from other observability systems to determine the root cause of the issue.

In some embodiments, the system includes a lag monitor and an offset explorer to enable users to observe the lag of a chosen consumer group in a detailed manner, including both topic-wise and partitions-wise lag. The system offers valuable insights into the possible causes of the current lag accumulation. This includes examining whether the producer is generating an excessive number of messages or if the consumer is processing them at a slower rate. In addition, the system considers factors such as the recent performance and health trends of the application, any recent changes, any reliability issues, and latencies when accessing downstream services or underlying platform technologies like databases and message queues.

The lag monitor can provide real-time observability into lagging consumer applications and the facts and events that could have probably resulted in lag experienced by the lagging applications. In some embodiments, the lag monitor can be implemented as part of the unified observability unit 740 in the architecture 700. In some embodiments, the lag monitor is implemented like an incident management system but with additional insights for the incident handler to handle the consumer lag incidents efficiently and effectively.

In some embodiments, an incident ticket is created whenever there is an alert or pre-alert indicating a consumer application is facing lag. If the lag subsides on its own, the ticket gets closed automatically. If the lag persists, the ticket is assigned or self-assigned to a user, who would be investigating into the incident with the help of additional insights provided by the unified observability method disclosed herein.

In some embodiments, the lag monitor provides observability into both data platform broker side and data platform client application runtime side of the workload, to indicate where the application is deployed, including whether the consumer is residing in one region and consuming from broker in another remote region. The lag monitor can also provide insights into data platform topic health and performance metrics such as incoming message trend, traffic trend, application processing health and performance trend such as message processing time trend, commit trend, trend of volume of messages processed per second, etc. The lag monitor can also provide observability into resource availability and utilization trend of the consumer application such as CPU and memory utilization trends.

An offset explorer can provide real-time observability of lagging consumer application and the topics and partitions from which the consumer application is consuming from. In some embodiments, the offset explorer can be implemented as part of the unified observability unit 740 in the architecture 700. In some embodiments, the user interface 900 is a user interface for an offset explorer.

In some embodiments, for a given consumer application, the offset explorer provides the following insights: (i) data platform consumer configurations, including configurations related to max poll intervals, max poll records, heartbeat intervals, etc., with which the consumer is bootstrapped and running; (ii) topics details such as all the topics and their partitions from which the selected consumer application is consuming from; (iii) consumer group details such as how many consumer instances (threads) are running; (iv) application runtime deployment details such as which are the data centers and regions where the application is deployed, how many pods are running, and whether the consumer instances are running in active-active or active-standby modes; (v) consumer group status in real-time, such as whether the consumer group is active or inactive, when it is active, whether it is stable or rebalancing; (vi) the offset statistic of each partition for each of the topics consumed by the application, e.g. earliest, current, latest offsets can be provided for each partition to show lag at each partition level; and (vii) trend graphs such as CPU and memory utilization trends, message processing time and count trends, etc. provided at individual partition level.

In some embodiments, all of these observabilities can help users to easily gain the insight as to what is the issue and what action to be taken to quickly resolve the problem. Appropriate recoverability actions (e.g. SOPs) such as managing the application (e.g. stop, start, restart, scale up, scale down) and offset reset and/or delete can be provided both in lag monitor and offset explorer.

In some embodiments, a lag monitor gets notified of all the data platform consumer lag alerts and pre-alerts. Whenever a consumer lag alert or pre-alert is received, the lag monitor starts retrieving and recording the related metrics from various metrics sources. These metrics are analyzed to determine the source and cause of the lag. Some metrics are available only from the time the lag monitor received the alert and started profiling. Some metrics such as incoming messages per second, average topic level lag of consumer group are always available, which the lag monitor leverages to present to the user and to analyze and determine if there are variations in these trends when comparing current time and time prior to the lag.

In some embodiments, the lag monitor can continuously monitor if the lag is persisting or subsiding eventually. If the lag subsides after some time, the lag monitor adds a record of this event, stops monitoring the lag, and closes the incident. If a user assigns the ticket for further investigation, the lag monitor does not close the ticket automatically even if the lag subsides automatically. Instead the lag monitor continues to retrieve all the related metrics and data that will be helpful for the investigator to investigate the incident. The lag monitor can obtain all the supportive data from application runtime platform, platform brokers, and other metrics and monitoring systems. The data can be obtained both in snapshot form and in time-series form wherever possible.

In some embodiments, the offset explorer provides extended observability of facts and events that are probably resulting in the lag one is investigating currently. In some examples, for a selected consumer group, the offset explorer subscribes to an offset stream to obtain partitions-wise offsets statistics at every 10 seconds for all the topics from which the consumer group is consuming from. The offset explorer can enhance the stream content with additional enriched data, and stream further to the front-end. The additional data like WCNP cluster, node IP where the consumer instance that consumes messages from a given partition is running on, can be added to the offset stream. By subscribing agent configuration events topic and collecting the configuration of consumer applications, the offset explorer can present the information for the users to view the configurations used by the consumer application. The offset explorer can also accumulate various metrics and populate the time-series for each partition level, which is presented for the users to visualize how the partition-level consumption and lag has been trending since the time the lag is noticed by the lag monitor or when the user started monitoring the consumer group in the offset explorer.

Figure 10:
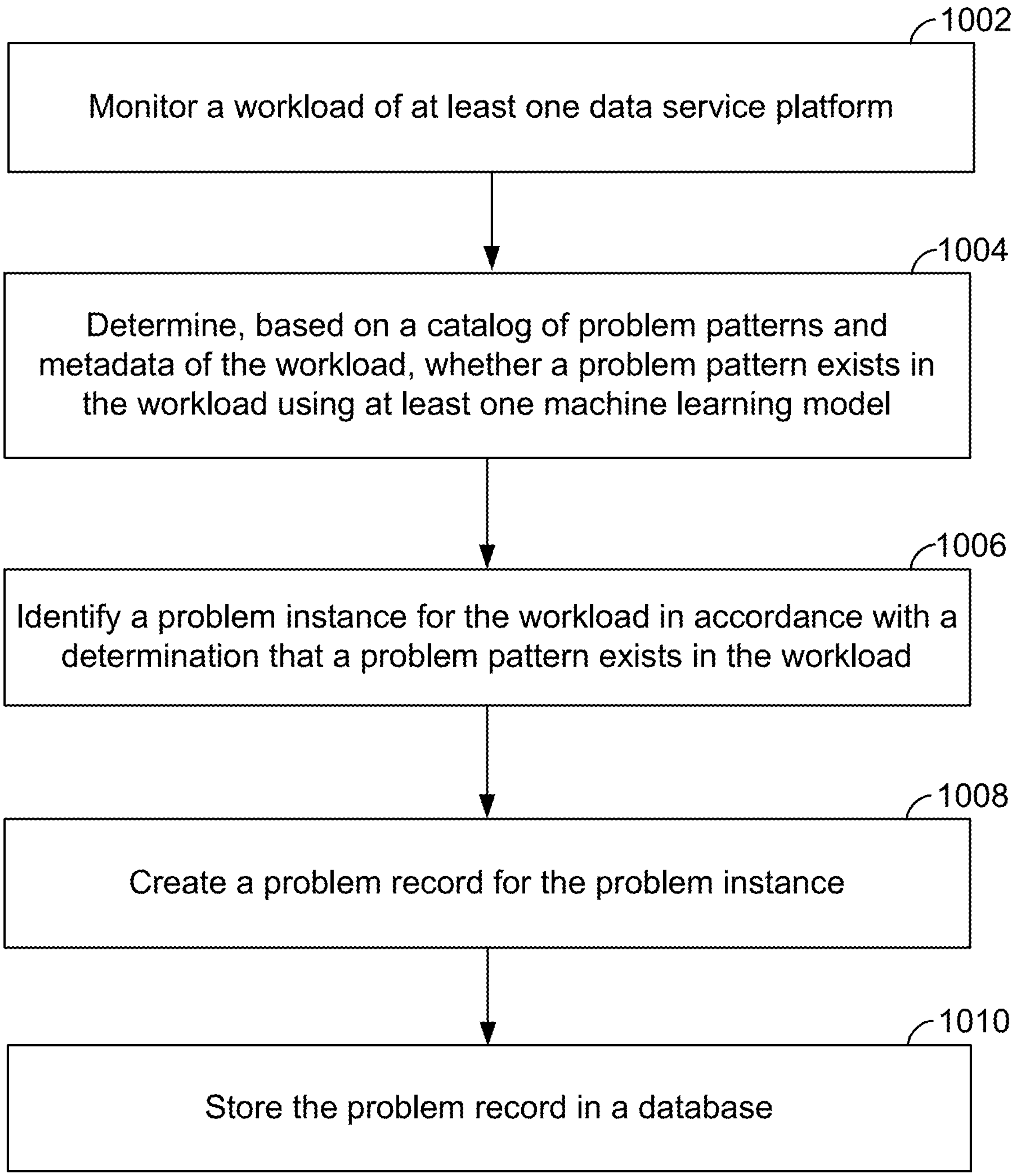
FIG. 10 shows a flowchart illustrating an exemplary method for automatically identifying problem instances in data service workloads, in accordance with some embodiments of the present teaching.

FIG. 10 is a flowchart illustrating an exemplary method 1000 for automatically identifying problem instances in data service workloads, in accordance with some embodiments of the present teaching. In some embodiments, the method 1000 can be carried out by one or more computing devices, such as the data reliability computing device 102 and/or the cloud-based engine 121 of FIG. 1. Beginning at operation 1002, a workload of at least one data service platform is monitored. At operation 1004, based on a catalog of problem patterns and metadata of the workload, it is determined whether a problem pattern exists in the workload using at least one machine learning model. At operation 1006, a problem instance is identified for the workload in accordance with a determination that a problem pattern exists in the workload. A problem record is created for the problem instance at operation 1008, and is stored in a database at operation 1010.

In some embodiments, the at least one data service platform stores messages coming from producer applications; the messages are partitioned into different partitions with different topics; messages within each partition are ordered by their offsets; and partitions of all topics are distributed across clusters. In some embodiments, the metadata of the workload comprises data related to: one or more clusters in the workload; a list of topics hosted on the one or more clusters; a number of partitions of each topic; partition assignment strategy for each topic; a list of consumer applications consuming each topic; and configurations of the one or more clusters and the topics.

In some embodiments, determining whether a problem pattern exists in the workload comprises: analyzing the metadata using a plurality of problem pattern rules each associated with a corresponding problem pattern in the catalog of problem patterns; and determining whether a problem pattern exists in the workload based on a corresponding problem pattern rule. In some embodiments, the analyzing is executed based on at least one of: a periodic configuration, a consumer alert, or a user request; and the metadata comprises relevant metrics from observability data sources of the at least one data service platform. In some embodiments, the analyzing is executed based on an alert of consumer lag; the relevant metrics comprise: incoming messages per second, processor utilization of consumer applications, and other metrics related to the consumer lag; and the analyzing comprises analyzing the relevant metrics to determine whether there is a variation in trends of the relevant metrics before and after the consumer lag.

In some embodiments, the at least one machine learning model is trained based on: a predetermined set of problem patterns, historical detected problem instances and/or labelled problem instances. In some embodiments, the at least one processor is configured to: present the problem instance to a user via an application programming interface (API); determine a problem solution based on the problem instance and a catalog of problem solutions, wherein the problem solution is associated with the problem pattern existing in the workload; and execute the problem solution to recover the workload.

Figure 11:
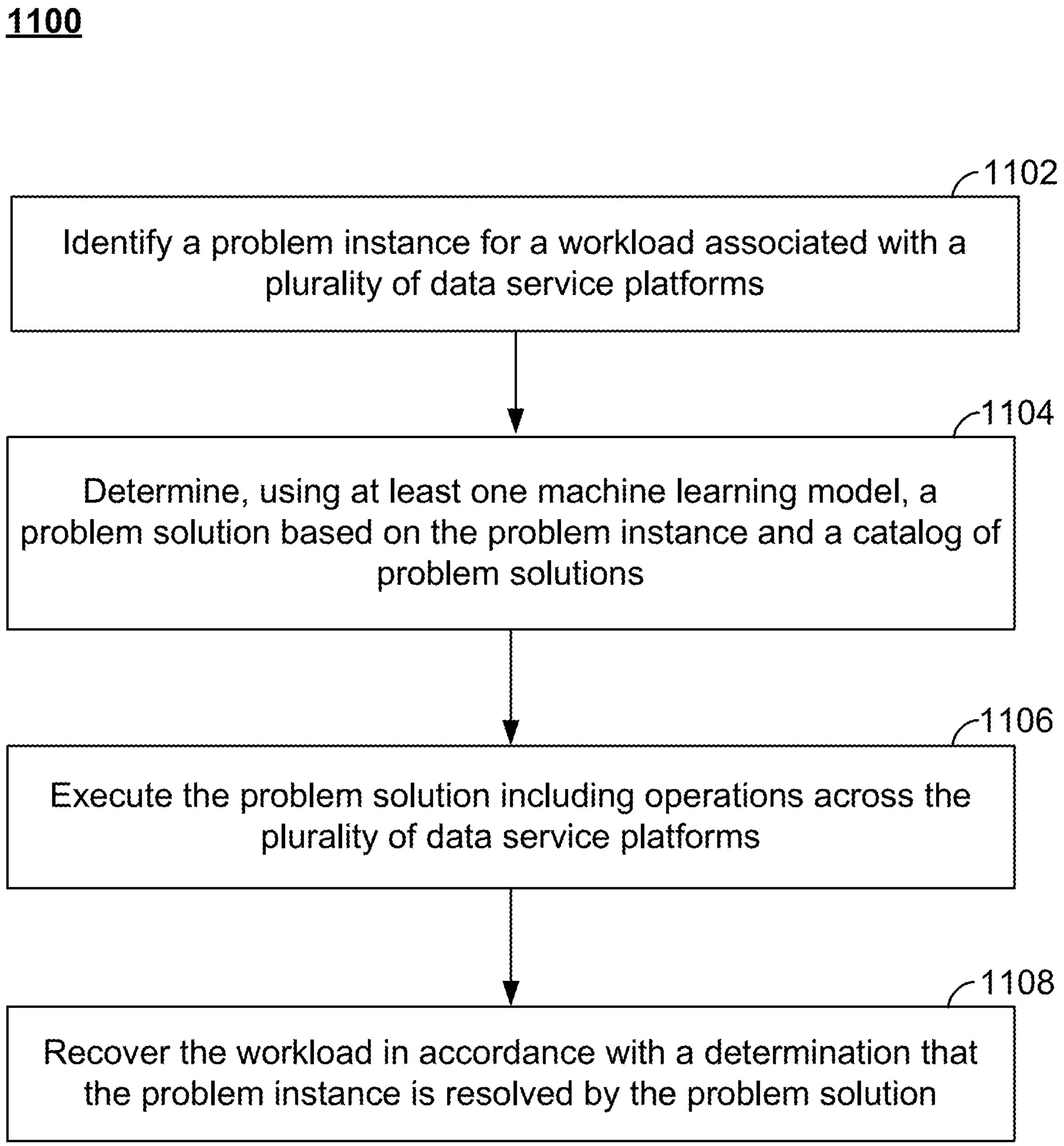
FIG. 11 shows a flowchart illustrating an exemplary method for automatically identifying and resolving problem instances in data service workloads, in accordance with some embodiments of the present teaching.

FIG. 11 shows a flowchart illustrating an exemplary method 1100 for automatically identifying and resolving problem instances in data service workloads, in accordance with some embodiments of the present teaching. In some embodiments, the method 1100 can be carried out by one or more computing devices, such as the data reliability computing device 102 and/or the cloud-based engine 121 of FIG. 1. Beginning at operation 1102, a problem instance is identified for a workload associated with a plurality of data service platforms. At operation 1104, using at least one machine learning model, a problem solution is determined based on the problem instance and a catalog of problem solutions. At operation 1106, the problem solution including operations is executed across the plurality of data service platforms. At operation 1108, the workload is recovered in accordance with a determination that the problem instance is resolved by the problem solution.

In some embodiments, the plurality of data service platforms store messages coming from producer applications; the messages are partitioned into different partitions with different topics; messages within each partition are ordered by their offsets; and partitions of all topics are distributed across clusters.

In some embodiments, the problem solution is determined based on: determining, based on the problem instance, a problem pattern that exists in the workload, wherein the problem pattern is among a catalog of problem patterns each of which is associated with a respective problem solution in the catalog of problem solutions; and selecting, from the catalog of problem solutions, the problem solution that is associated with the problem pattern.

In some embodiments, the problem pattern is a juggler pattern where the workload is deployed with a less number of consumer instances across consumer applications than a total number of partitions from which messages are to be consumed; and the problem solution comprises at least one of: adding at least one additional consumer application, where partitions assigned to the at least one additional consumer application are co-assigned to existing consumer applications, or restarting a consumer application in accordance with a determination that the consumer application has a temporary issue causing the juggler pattern.

In some embodiments, the problem pattern is a time slicer pattern where the workload is deployed with consumer applications provisioned with a less number of processor cores than a number of consumer instances configured per consumer application; and the problem solution comprises at least one of: increasing a total quantity of consumer applications, where additional consumer instances in additional consumer applications are assigned with dedicated processor cores to process messages independent of other consumer instances, or increasing a total quantity of processor cores, where each consumer application provides dedicated processor cores for consumer instances running on the consumer application.

In some embodiments, the problem pattern is a headline pattern where a same topic in the workload is consumed by multiple consumer applications more than a predetermined threshold; and the problem solution comprises at least one of: stopping and re-starting at least one of the multiple consumer applications, or scaling up or down a total quantity of consumer instances.

In some embodiments, the problem pattern is a know-all pattern where one consumer application is consuming from multiple topics more than a predetermined threshold; and the problem solution comprises at least one of: stopping and re-starting the consumer application, or scaling up or down a total quantity of consumer instances.

In some embodiments, the problem pattern is a quiescent topic pattern where a topic is not consumed by any consumer application for a time period longer than a predetermined threshold; and the problem solution comprises at least one of: starting at least one consumer application in accordance with a determination that the at least one consumer application is inactive, or deleting the topic and re-claiming its associated space.

In some embodiments, the problem pattern is a diehard client pattern where a client application is implemented using an unsupported version of client library, wherein the client application is a producer application or a consumer application; and the problem solution comprises at least one of: stopping and re-starting the client application, or sending a notification for planning and upgrading the client application to use a supported version of client library or migrate to a newer data service platform.

In some embodiments, the at least one machine learning model is trained based on: a predetermined set of problem patterns, a predetermined set of problem solutions, historical problem solutions and/or labelled problem solutions; and the problem instance is identified during either a development stage or a production stage of the plurality of data service platforms.

In some embodiments, the problem solution is determined based on metadata of the workload; and the metadata of the workload comprises data related to: one or more clusters in the workload, a list of topics hosted on the one or more clusters, a number of partitions of each topic, partition assignment strategy for each topic, a list of consumer applications consuming each topic, and configurations of the one or more clusters and the topics.

The unified observability and recoverability mechanisms disclosed above can be used by application developers during the design, development, and maintenance phases for proactively identifying and fixing the issues, thus preventing potential production incidents; and can also be used by agents during pre-alert investigation and incidents to avoid or recover from the incidents, respectively. In some embodiments, the unified observability and recoverability mechanisms disclosed above can be used for any data service platform. In some embodiments, a disclosed system providing the unified observability and recoverability mechanisms can also: enhance support for observability and recoverability of message proxying service applications, predict consumer lag and perform the unified observability and recoverability mechanisms using machine learning or AI models, and/or build problem patterns, observability, and recoverability of producer applications.

Although the methods described above are with reference to the illustrated flowcharts, it will be appreciated that many other ways of performing the acts associated with the methods can be used. For example, the order of some operations may be changed, and some of the operations described may be optional.

The methods and system described herein can be at least partially embodied in the form of computer-implemented processes and apparatus for practicing those processes. The disclosed methods may also be at least partially embodied in the form of tangible, non-transitory machine-readable storage media encoded with computer program code. For example, the steps of the methods can be embodied in hardware, in executable instructions executed by a processor (e.g., software), or a combination of the two. The media may include, for example, RAMs, ROMs, CD-ROMs, DVD-ROMs, BD-ROMs, hard disk drives, flash memories, or any other non-transitory machine-readable storage medium. When the computer program code is loaded into and executed by a computer, the computer becomes an apparatus for practicing the method. The methods may also be at least partially embodied in the form of a computer into which computer program code is loaded or executed, such that, the computer becomes a special purpose computer for practicing the methods. When implemented on a general-purpose processor, the computer program code segments configure the processor to create specific logic circuits. The methods may alternatively be at least partially embodied in application specific integrated circuits for performing the methods.

Each functional component described herein can be implemented in computer hardware, in program code, and/or in one or more computing systems executing such program code as is known in the art. As discussed above with respect to FIG. 2, such a computing system can include one or more processing units which execute processor-executable program code stored in a memory system. Similarly, each of the disclosed methods and other processes described herein can be executed using any suitable combination of hardware and software. Software program code embodying these processes can be stored by any non-transitory tangible medium, as discussed above with respect to FIG. 2.

The foregoing is provided for purposes of illustrating, explaining, and describing embodiments of these disclosures. Modifications and adaptations to these embodiments will be apparent to those skilled in the art and may be made without departing from the scope or spirit of these disclosures. Although the subject matter has been described in terms of exemplary embodiments, it is not limited thereto. Rather, the appended claims should be construed broadly, to include other variants and embodiments, which can be made by those skilled in the art.

What is claimed is:

1. A system, comprising:

a non-transitory memory having instructions stored thereon; and at least one processor operatively coupled to the non-transitory memory, and configured to read the instructions to:

generate training data for at least one machine learning model based on historical problem data, historical detected problem instances, historical solution data, historical or labelled problem data and solution data, and metadata related to client applications, clusters, and topics of the data service platform;

train the at least one machine learning model to learn to detect workload problem patterns based on the training data;

receive, over a network, an observability request for at least one data service platform that stores messages coming from producer applications and, in response, receive metadata for the at least one data service platform that includes data related to one or more clusters in the workload and at least one of:

one or more topics hosted on the one or more clusters, a number of partitions for each of the one or more topics, one or more consumer applications consuming each of the one or more topics, or one or more configurations of the one or more clusters and the one or more topics;

determine, based on a catalog of problem patterns and the metadata of the workload, that a problem pattern exists in the workload using the trained at least one machine learning model;

generate observability data that identifies a problem instance for the workload in accordance with the determination that the problem pattern exists in the workload;

create a problem record for the problem instance based on the observability data;

store the problem record in a database; and transmit, over the network, the problem record in response to the observability request.

2. The system of claim 1, wherein the metadata of the workload includes the data related to each of the:

the one or more topics hosted on the one or more clusters, the number of partitions for each of the one or more topics, a partition assignment strategy for each of the one or more topics, the one or more consumer applications consuming each of the one or more topics, and the one or more configurations of the one or more clusters and the one or more topics.

3. The system of claim 1, wherein the catalog of problem patterns includes a juggler pattern where a workload is deployed with a less number of consumer instances across consumer applications than a total number of partitions from which messages are to be consumed, a time slicer pattern where a workload is deployed with consumer applications provisioned with a less number of processor cores than a number of consumer instances configured per consumer application, a headline pattern where a same topic in a workload is consumed by multiple consumer applications more than a predetermined threshold, a know-all pattern where one consumer application is consuming from multiple topics more than a predetermined threshold, a quiescent topic pattern where a topic is not consumed by any consumer application for a time period longer than a predetermined threshold, and a diehard client pattern where a client application is implemented using an unsupported version of client library.

4. The system of claim 1, wherein determining whether a problem pattern exists in the workload comprises:

analyzing the metadata using a plurality of problem pattern rules each associated with a corresponding problem pattern in the catalog of problem patterns; and determining whether a problem pattern exists in the workload based on a corresponding problem pattern rule.

5. The system of claim 4, wherein:

the analyzing is executed based on at least one of: a periodic configuration, a consumer alert, or a user request; and the metadata comprises relevant metrics from observability data sources of the at least one data service platform.

6. The system of claim 5, wherein:

the analyzing is executed based on an alert of consumer lag;

the relevant metrics comprise: incoming messages per second, processor utilization of consumer applications, and other metrics related to the consumer lag; and the analyzing comprises analyzing the relevant metrics to determine whether there is a variation in trends of the relevant metrics before and after the consumer lag.

7. The system of claim 1, wherein:

the at least one machine learning model is trained based on: a predetermined set of problem patterns, historical detected problem instances and/or labelled problem instances.

8. The system of claim 1, wherein:

the workload is monitored during either a development stage or an implementation stage of the at least one data service platform.

9. The system of claim 1, wherein the at least one processor is configured to:

present the problem instance to a user via an application programming interface (API);

determine a problem solution based on the problem instance and a catalog of problem solutions, wherein the problem solution is associated with the problem pattern existing in the workload; and execute the problem solution to recover the workload.

10. A computer-implemented method, comprising:

generating training data for at least one machine learning model based on historical problem data, historical detected problem instances, historical solution data, historical or labelled problem data and solution data, and metadata related to client applications, clusters, and topics of the data service platform;

training the at least one machine learning model to learn to detect workload problem patterns based on the training data;

receiving, over a network, an observability request for at least one data service platform that stores messages coming from producer applications and, in response, receiving metadata for the at least one data service platform that includes data related to one or more clusters in the workload and at least one of:

one or more topics hosted on the one or more clusters, a number of partitions for each of the one or more topics, one or more consumer applications consuming each of the one or more topics, or one or more configurations of the one or more clusters and the one or more topics;

determining, based on a catalog of problem patterns and the metadata of the workload, that a problem pattern exists in the workload using the trained at least one machine learning model;

generating observability data that identifies a problem instance for the workload in accordance with the determination that the problem pattern exists in the workload;

creating a problem record for the problem instance based on the observability data;

storing the problem record in a database; and transmitting, over the network, the problem record in response to the observability request.

11. The computer-implemented method of claim 10, wherein the metadata of the workload includes the data related to each of the:

the one or more topics hosted on the one or more clusters, the number of partitions for each of the one or more topics, a partition assignment strategy for each of the one or more topics, the one or more consumer applications consuming each topic, and the one or more configurations of the one or more clusters and the one or more topics.

12. The computer-implemented method of claim 10, wherein the catalog of problem patterns includes a juggler pattern where a workload is deployed with a less number of consumer instances across consumer applications than a total number of partitions from which messages are to be consumed, a time slicer pattern where a workload is deployed with consumer applications provisioned with a less number of processor cores than a number of consumer instances configured per consumer application, a headline pattern where a same topic in a workload is consumed by multiple consumer applications more than a predetermined threshold, a know-all pattern where one consumer application is consuming from multiple topics more than a predetermined threshold, a quiescent topic pattern where a topic is not consumed by any consumer application for a time period longer than a predetermined threshold, and a diehard client pattern where a client application is implemented using an unsupported version of client library.

13. The computer-implemented method of claim 10, wherein determining whether a problem pattern exists in the workload comprises:

analyzing the metadata using a plurality of problem pattern rules each associated with a corresponding problem pattern in the catalog of problem patterns; and determining whether a problem pattern exists in the workload based on a corresponding problem pattern rule.

14. The computer-implemented method of claim 13, wherein:

the analyzing is executed based on at least one of: a periodic configuration, a consumer alert, or a user request; and the metadata comprises relevant metrics from observability data sources of the at least one data service platform.

15. The computer-implemented method of claim 14, wherein:

the analyzing is executed based on an alert of consumer lag;

the relevant metrics comprise: incoming messages per second, processor utilization of consumer applications, and other metrics related to the consumer lag; and the analyzing comprises analyzing the relevant metrics to determine whether there is a variation in trends of the relevant metrics before and after the consumer lag.

16. The computer-implemented method of claim 10, wherein:

the at least one machine learning model is trained based on: a predetermined set of problem patterns, historical detected problem instances and/or labelled problem instances.

17. The computer-implemented method of claim 10, further comprising:

presenting the problem instance to a user via an application programming interface (API);

determining a problem solution based on the problem instance and a catalog of problem solutions, wherein the problem solution is associated with the problem pattern existing in the workload; and executing the problem solution to recover the workload.

18. A non-transitory computer readable medium having instructions stored thereon, wherein the instructions, when executed by at least one processor, cause at least one device to perform operations comprising:

generating training data for at least one machine learning model based on historical problem data, historical detected problem instances, historical solution data, historical or labelled problem data and solution data, and metadata related to client applications, clusters, and topics of the data service platform;

training the at least one machine learning model to learn to detect workload problem patterns based on the training data;

receiving, over a network, an observability request for at least one data service platform that stores messages coming from producer applications and, in response, receiving metadata for the at least one data service platform that includes data related to one or more clusters in the workload and at least one of:

one or more topics hosted on the one or more clusters, a number of partitions for each of the one or more topics, one or more consumer applications consuming each of the one or more topics, or one or more configurations of the one or more clusters and the one or more topics, determining, based on a catalog of problem patterns and the metadata of the workload, that a problem pattern exists in the workload using the trained at least one machine learning model;

generating observability data that identifies a problem instance for the workload in accordance with the determination that the problem pattern exists in the workload;

creating a problem record for the problem instance based on the observability data;

storing the problem record in a database; and transmitting, over the network, the problem record in response to the observability request.

* * * * *